(12) United States Patent
Hosoi et al.

(10) Patent No.: US 8,520,318 B2
(45) Date of Patent: Aug. 27, 2013

(54) ZOOM LENS AND IMAGING APPARATUS

(75) Inventors: Masaharu Hosoi, Kanagawa (JP);
Hiroyuki Matsumoto, Wakayama (JP);
Masafumi Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 42 days.

(21) Appl. No.: 13/064,701

(22) Filed: Apr. 11, 2011

(65) Prior Publication Data

US 2011/0273780 A1 Nov. 10, 2011

(30) Foreign Application Priority Data

May 10, 2010 (JP) ................................. 2010-108665

(51) Int. Cl.
*G02B 15/14* (2006.01)

(52) U.S. Cl.
USPC ......................................... 359/690; 359/676

(58) Field of Classification Search
USPC ................. 359/690, 766, 773, 785, 554, 557, 359/676, 677, 680–684, 686, 687, 689, 695, 359/738–740, 745–758, 763, 764, 771, 772, 359/774, 784, 786–790, 708, 713, 714, 715
See application file for complete search history.

(56) References Cited

U.S. PATENT DOCUMENTS

| | | | | |
|---|---|---|---|---|
| 5,325,233 A * | 6/1994 | Nakatsuji et al. | ............. | 359/684 |
| 5,543,969 A * | 8/1996 | Ito | ................................. | 359/690 |
| 5,828,499 A * | 10/1998 | Ohtake | ......................... | 359/676 |
| 5,847,875 A * | 12/1998 | Kodama et al. | ............... | 359/557 |
| 5,930,049 A * | 7/1999 | Suenaga et al. | ............... | 359/650 |
| 6,028,716 A * | 2/2000 | Kato et al. | ..................... | 359/689 |
| 6,259,508 B1 * | 7/2001 | Shigematsu | .................... | 355/53 |
| 6,333,781 B1 * | 12/2001 | Shigematsu | .................... | 355/71 |
| 7,142,372 B2 * | 11/2006 | Eguchi | ........................... | 359/689 |
| 7,428,107 B2 * | 9/2008 | Nishimura | ..................... | 359/683 |
| 7,450,314 B2 * | 11/2008 | Satori et al. | .................... | 359/683 |
| 7,463,425 B1 * | 12/2008 | Chen | ............................. | 359/681 |
| 7,692,871 B2 * | 4/2010 | Obu et al. | ....................... | 359/687 |
| 7,773,312 B2 * | 8/2010 | Iwama | .......................... | 359/689 |
| 7,830,612 B2 * | 11/2010 | Hagiwara | ...................... | 359/676 |
| 8,031,409 B2 * | 10/2011 | Sato | .............................. | 359/676 |
| 8,169,711 B2 * | 5/2012 | Fujisaki | ......................... | 359/686 |
| 2001/0050820 A1 * | 12/2001 | Shafer et al. | .................... | 359/766 |

(Continued)

FOREIGN PATENT DOCUMENTS

| | | |
|---|---|---|
| JP | 2003-228001 A | 8/2003 |
| JP | 2008-152190 | 7/2008 |
| JP | 2009-282439 | 12/2009 |

*Primary Examiner* — Thomas K Pham
*Assistant Examiner* — Sharrief Broome
(74) *Attorney, Agent, or Firm* — Rader, Fishman & Grauer PLLC

(57) ABSTRACT

A zoom lens including first, second, and third lens groups having positive, negative, and positive refractive powers, respectively, which are arranged in that order from the object side to the image side such that, when zooming from wide-angle to telephoto, the first lens group moves to the object side, and spacings between the lens groups change. The third lens group has at least two lenses including a first lens, which is a positive lens arranged closer to the object side than the other lenses of the third lens group. Blur correction is performed by moving the first lens perpendicularly to the optical axis. The third lens group is configured such that the following conditional expression is satisfied: $0.3<(1-\beta kFW)\cdot\beta kRW<1.9$, where $\beta kFW$ and $\beta kRW$ are the lateral magnifications at wide-angle of, respectively, the first lens and the remaining lenses of the third lens group.

6 Claims, 17 Drawing Sheets

(56) References Cited

U.S. PATENT DOCUMENTS

| | | | |
|---|---|---|---|
| 2002/0001141 A1* | 1/2002 | Shafer et al. | 359/766 |
| 2003/0063268 A1* | 4/2003 | Kneer et al. | 355/67 |
| 2005/0057819 A1* | 3/2005 | Eguchi | 359/680 |
| 2006/0066953 A1* | 3/2006 | Nishio et al. | 359/676 |
| 2008/0304167 A1* | 12/2008 | Souma | 359/766 |
| 2009/0040604 A1* | 2/2009 | Obu et al. | 359/432 |
| 2009/0052052 A1* | 2/2009 | Yamano | 359/690 |
| 2009/0190220 A1* | 7/2009 | Sato | 359/557 |
| 2009/0244720 A1* | 10/2009 | Yamaguchi | 359/690 |
| 2009/0251782 A1* | 10/2009 | Nanba | 359/557 |
| 2010/0220400 A1* | 9/2010 | Yamamoto et al. | 359/690 |
| 2010/0302650 A1* | 12/2010 | Fujisaki | 359/686 |
| 2011/0026133 A1* | 2/2011 | Fujisaki | 359/683 |
| 2011/0102908 A1* | 5/2011 | Murayama | 359/687 |
| 2011/0273780 A1* | 11/2011 | Hosoi et al. | 359/690 |

* cited by examiner

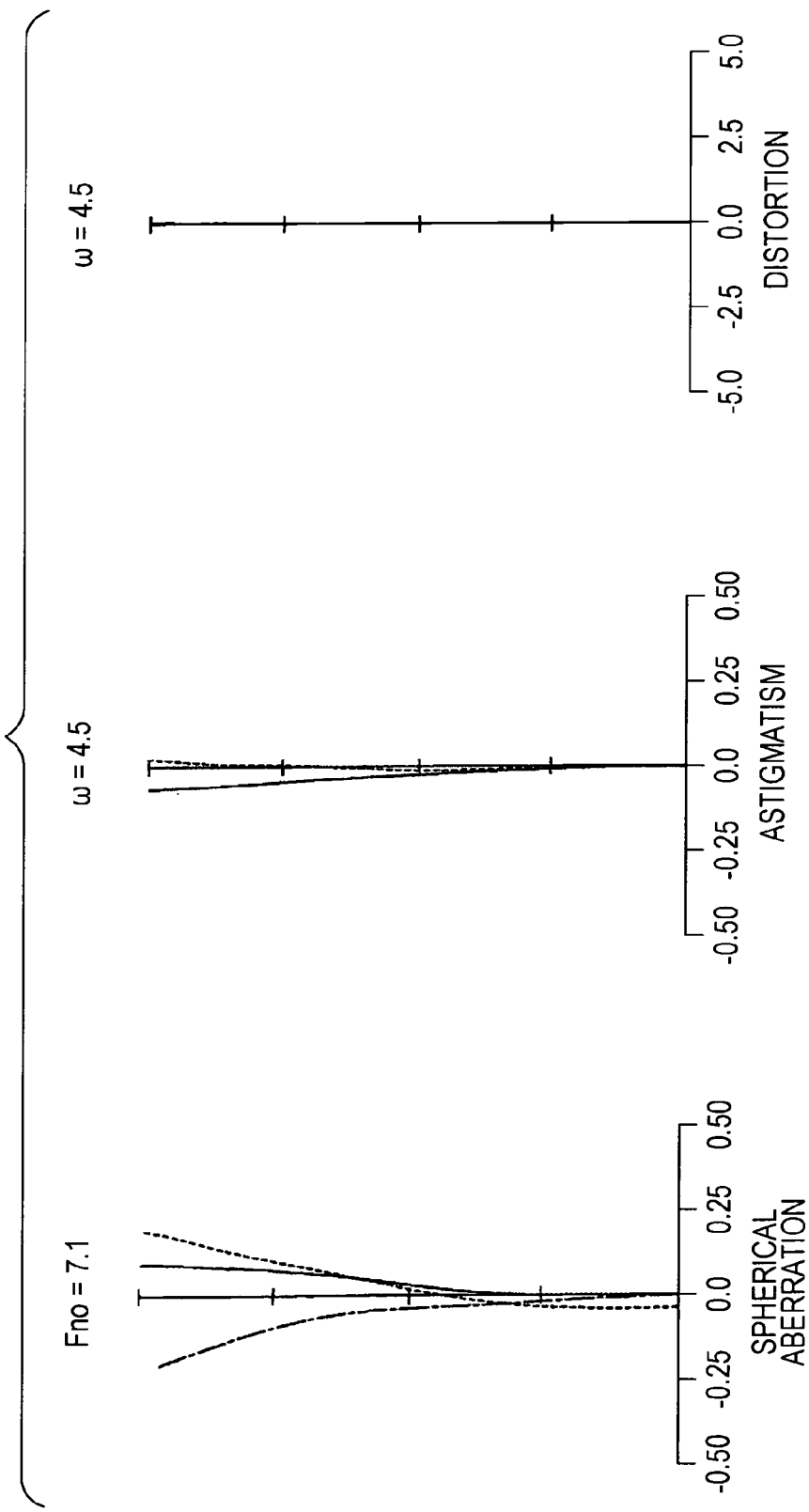

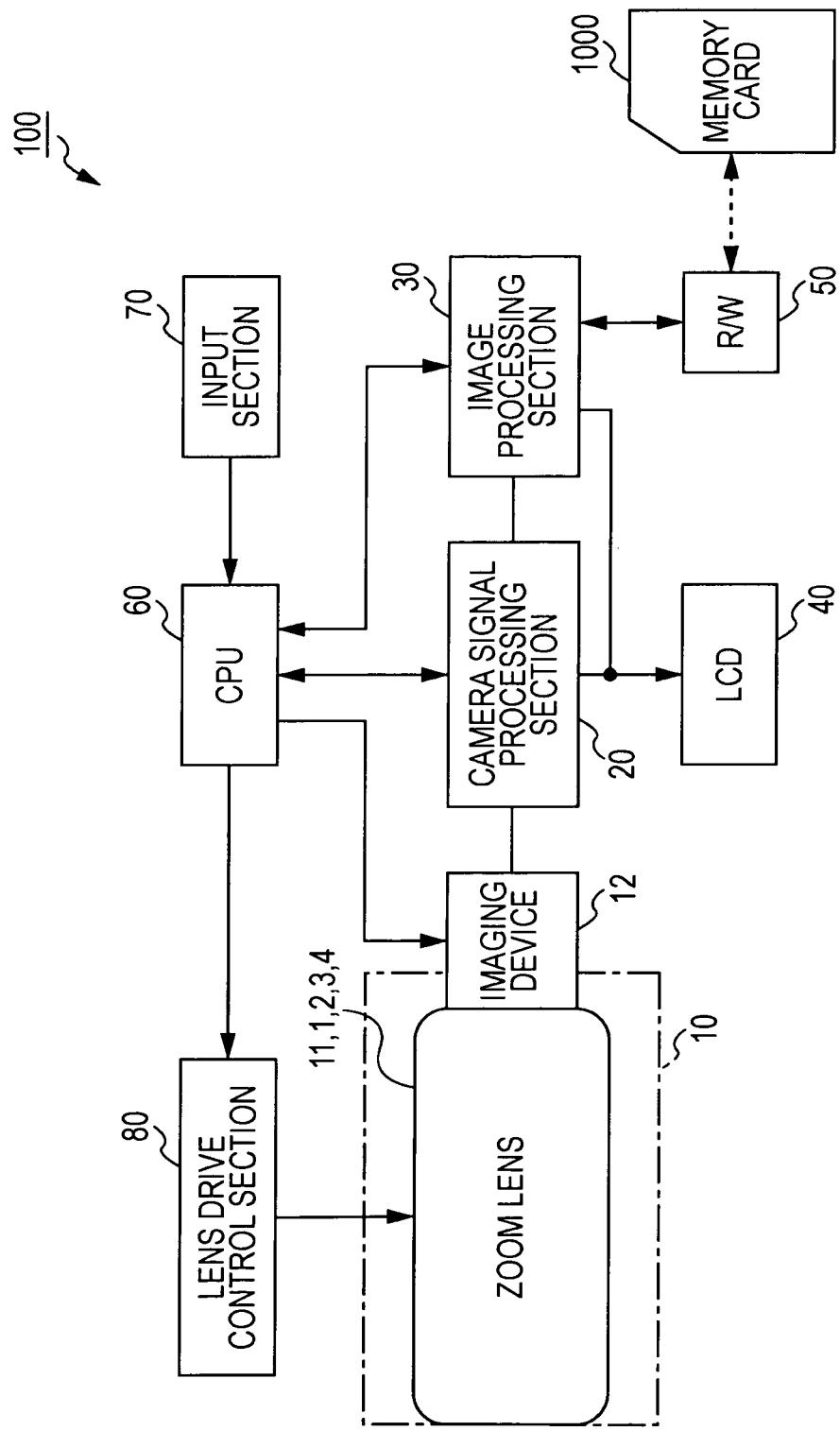

ZOOM LENS AND IMAGING APPARATUS

BACKGROUND OF THE INVENTION

1. Field of the Invention

The present invention relates to a zoom lens and an imaging apparatus. More specifically, the present invention relates to the technical field of a zoom lens that is suitable for use in photographic optical systems such as digital still cameras and video cameras, and achieves miniaturization and ensures high image-forming performance while providing a blur correction function, and an imaging apparatus including the zoom lens.

2. Description of the Related Art

In recent years, there has been a proliferation of imaging apparatuses using a solid state imaging device, such as digital still cameras. The proliferation of imaging apparatuses such as digital still cameras has created a demand for taking lenses, in particular, zoom lenses that are compact and offer high image-forming performance.

For zoom lenses, a blur correction function that optically corrects image blur caused by camera shake or the like during shooting has been widely adopted. In the case of interchangeable-lens digital cameras, in particular, it is desired that these zoom lens be equipped with a blur correction function while ensuring miniaturization of the lenses.

There are many kinds of zoom lenses used for digital still cameras. Among those, a type of zoom lenses having a first lens group having positive refractive power, a second lens group having negative refractive power, and a third lens group having positive refractive power, which are arranged in order from the object side to the image side, is widely available as a lens type that is suited for miniaturization.

Many kinds of schemes as described below exist as image blur correction schemes for this type of zoom lens.

For example, there exist a scheme which performs blur correction by moving the entire third lens group in a direction perpendicular to the optical axis (see, for example, Japanese Unexamined Patent Application Publication No. 2003-228001), and a scheme which performs blur correction by moving a plurality of lenses in the third lens group in a direction perpendicular to the optical axis (see, for example, Japanese Unexamined Patent Application Publication No. 2009-282439). Also, there exists a scheme in which a negative lens group is provided in a fourth lens group and a positive lens group is provided in a fifth lens group, and which performs blur correction by moving the entire fourth lens group in a direction perpendicular to the optical axis (see, for example, Japanese Unexamined Patent Application Publication No. 2008-152190).

SUMMARY OF THE INVENTION

However, since the zoom lenses described in Japanese Unexamined Patent Application Publication No. 2003-228001 and Japanese Unexamined Patent Application Publication No. 2009-282439 are each configured to correct blur by using a plurality of lenses in the third lens group, the weight of the blur correcting lens group that performs blur correction becomes large, leading to increased size of an actuator for operating the blur correcting lens group. This poses a problem in achieving miniaturization.

On the other hand, the zoom lens described in Japanese Unexamined Patent Application Publication No. 2008-152190 has a negative lens group provided in the fourth lens group, and uses the fourth lens group having a small weight as a blur correcting lens group. Thus, the size of the actuator for operating the blur correcting lens group becomes small, thereby achieving miniaturization.

However, when the fourth lens group is used as a blur correcting lens group, the sensitivity of the blur correcting lens group to eccentricity increases. Thus, focus misalignment caused by unsteadiness of the blur correcting lens group with respect to the optical axis becomes greater, resulting in deterioration of image-forming performance.

It is desirable to provide a zoom lens and an imaging apparatus which achieve miniaturization and also ensure high image-forming performance while providing a blur correction function.

According to an embodiment of the present invention, there is provided a zoom lens including a first lens group having positive refractive power, a second lens group having negative refractive power, and a third lens group having positive refractive power, the first to third lens groups being arranged in order from the object side to the image side. When zooming from the wide-angle end state to the telephoto end state, the first lens group moves to the object side, and spacings between the first to third lens groups change. The third lens group has at least two lenses including a positive lens arranged closest to the object side. Blur correction on the image plane when blur occurs is performed by moving the positive lens of the third lens group in a direction perpendicular to the optical axis. The zoom lens satisfies the following conditional expression (1):

$$0.3 < (1 - \beta kFW) \cdot \beta kRW < 1.9 \quad (1)$$

where $\beta kFW$ is the lateral magnification at the wide-angle end of the positive lens arranged closest to the object side in the third lens group, and $\beta kRW$ is the lateral magnification at the wide-angle end of a lens group including all the lenses arranged closer to the image side than the positive lens arranged closest to the object side in the third lens group.

Therefore, in the zoom lens, the positive lens arranged closest to the object side in the third lens group is moved in a direction perpendicular to the optical axis to thereby correct image blur, and also the ratio of lateral magnification at the wide-angle end between the positive lens and the lens group arranged closer to the image side than the positive lens is optimized.

In the zoom lens mentioned above, it is desirable to satisfy the following conditional expression (2):

$$1.5 < fk/f3 < 4.0 \quad (2)$$

where fk is the focal length of the positive lens arranged closest to the object side in the third lens group, and f3 is the focal length of the third lens group.

When the zoom lens satisfies conditional expression (2), the amount of movement of the positive lens when correcting blue is optimized.

In the zoom lens mentioned above, it is desirable that the third lens group include the positive lens arranged on the object side of an aperture stop, and a lens group arranged on the image side of the aperture stop and having positive refractive power.

When the third lens group includes the positive lens arranged on the object side of the aperture stop and the lens group arranged on the image side of the aperture stop and having positive refractive power, the blur correcting lens is arranged closest to the object side within the third lens group on the object side of the aperture stop.

In the zoom lens mentioned above, it is desirable that the zoom lens further include a fourth lens group arranged on the image side of the third lens group and having negative refractive power, the fourth lens group being moved in the optical axis direction to perform focusing, and a fifth lens group arranged on the image side of the fourth lens group and having positive refractive power, and that the following conditional expression (3) be satisfied:

$$2.5<(1-\beta G4t)^2 \cdot (\beta G4t)^2 <5.0, \quad (3)$$

where $\beta G4t$ is the lateral magnification of the fourth lens group, and $\beta G5t$ is the lateral magnification of the fifth lens group.

By arranging the fourth lens group for performing focusing and the fifth lens group, and satisfying conditional expression (3), a lens group with a small effective diameter is used as a focusing lens group, and the amount of movement necessary for focusing is optimized.

In the zoom lens mentioned above, it is desirable that the fourth lens group include only a single negative lens.

When the fourth lens group includes only a single negative lens, the focusing lens group becomes lightweight.

According to an embodiment of the present invention, there is provided an imaging apparatus including a zoom lens, and an imaging device that converts an optical image formed by the zoom lens into an electrical signal. The zoom lens has a first lens group having positive refractive power, a second lens group having negative refractive power, and a third lens group having positive refractive power, the first to third lens groups being arranged in order from the object side to the image side. When zooming from the wide-angle end state to the telephoto end state, the first lens group moves to the object side, and spacings between the first to third lens groups change. The third lens group has at least two lenses including a positive lens arranged closest to the object side. Blur correction on the image plane when blur occurs is performed by moving the positive lens of the third lens group in a direction perpendicular to the optical axis. The zoom lens satisfies the following conditional expression (1):

$$0.3<(1-\beta kFW)\cdot \beta kRW<1.9 \quad (1)$$

where $\beta kFW$ is the lateral magnification at the wide-angle end of the positive lens arranged closest to the object side in the third lens group, and $\beta kRW$ is the lateral magnification at the wide-angle end of a lens group including all lenses arranged closer to the image side than the positive lens arranged closest to the object side in the third lens group.

Therefore, in the imaging apparatus, the positive lens arranged closest to the object side in the third lens group is moved in a direction perpendicular to the optical axis to thereby correct image blur, and also the ratio of lateral magnification at the wide-angle end between the positive lens and the lens group arranged closer to the image side than the positive lens is optimized.

BRIEF DESCRIPTION OF THE DRAWINGS

FIG. 16 is a diagram showing spherical aberration, astigmatism, and distortion in the telephoto end state; and FIG. 17 is a block diagram showing an imaging apparatus according to an embodiment.

DESCRIPTION OF THE PREFERRED EMBODIMENTS

Figure 1:
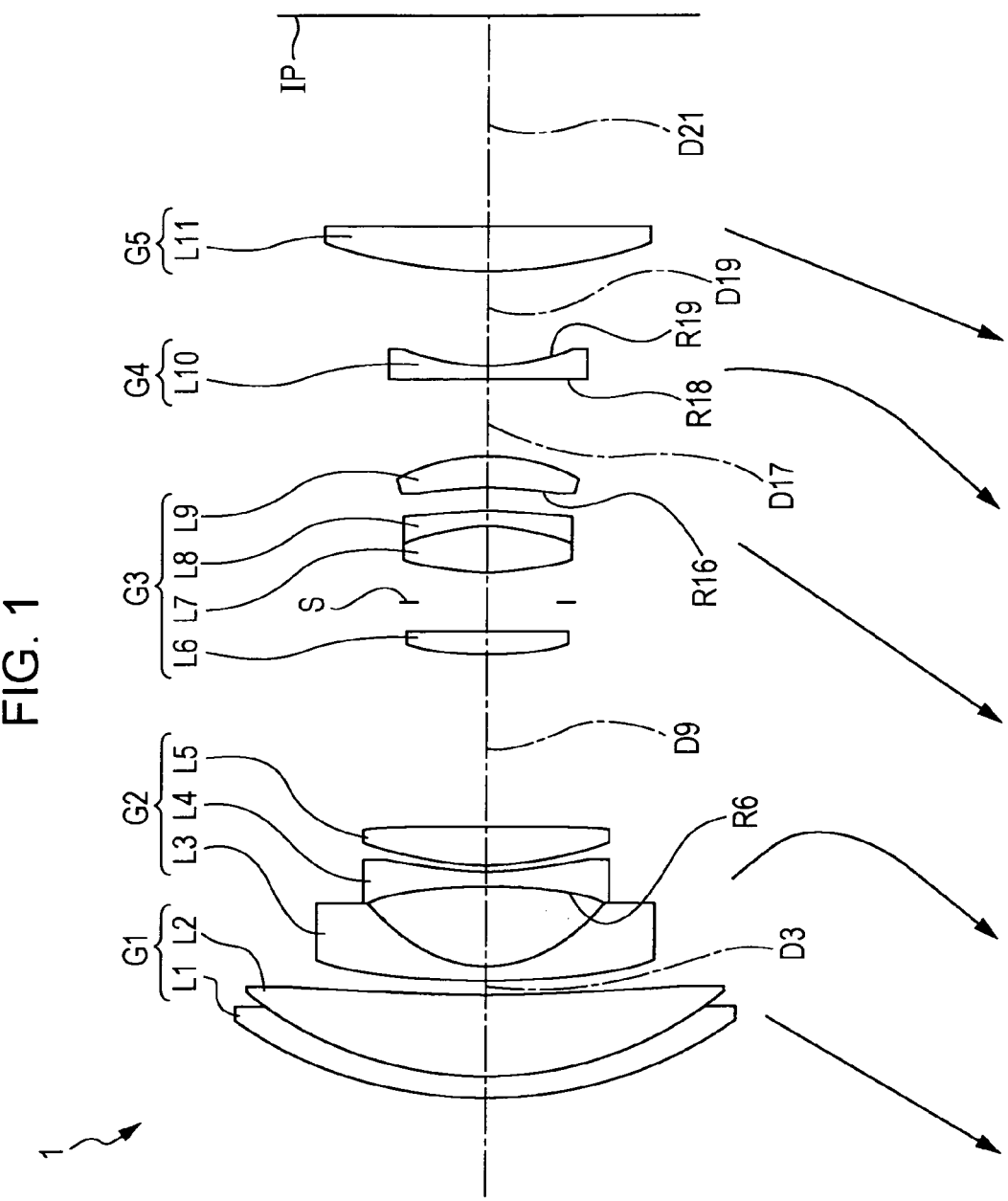
FIG. 1 is a diagram showing the lens configuration of a zoom lens according to a first embodiment.

Hereinbelow, a zoom lens and an imaging apparatus according to embodiments of the present invention will be described.

[Configuration of Zoom Lens]

A zoom lens according to an embodiment of the present invention has a first lens group having positive refractive power, a second lens group having negative refractive power, and a third lens group having positive refractive power, which are arranged in order from the object side to the image side. When zooming from the wide-angle end state to the telephoto end state, the first lens group moves to the object side, and spacings between the lens groups change.

Also, in the zoom lens according to an embodiment of the present invention, the third lens group has at least two lenses including a positive lens arranged closest to the object side. Blur correction on the image plane when blur occurs is performed by moving the positive lens of the third lens group in a direction perpendicular to the optical axis.

In the zoom lens according to an embodiment of the present invention, as mentioned above, only the positive lens arranged closest to the object side in the third lens group is used as a blur correcting lens group. Thus, the weight of the blur correcting lens group is small, and the actuator for operating the blur correcting lens group becomes small, thereby achieving miniaturization.

The zoom lens according to an embodiment of the present invention satisfies the following conditional expression (1):

$$0.3<(1-\beta kFW)\cdot \beta kRW<1.9 \quad (1)$$

where $\beta kFW$ is the lateral magnification at the wide-angle end of the positive lens arranged closest to the object side in the third lens group, and $\beta kRW$ is the lateral magnification at the wide-angle end of a lens group including all the lenses arranged closer to the image side than the positive lens arranged closest to the object side in the third lens group.

Conditional expression (1) is an expression that defines the relationship between the lateral magnification at the wide-angle end of the positive lens arranged closest to the object side in the third lens group, and the lateral magnification at the wide-angle end of the lens group including all the lenses arranged closer to the image side than the positive lens.

A value below the lower limit of conditional expression (1) causes the amount of movement of the positive lens (blur correcting lens) for performing blur correction to become large, leading to increased size of the mechanism for performing blur correction.

Conversely, a value above the upper limit of conditional expression (1) makes it hard to favorably correct aberration produced when correcting blur.

Therefore, when the zoom lens satisfies conditional expression (1), it is possible to make the amount of movement of the positive lens small to thereby achieve miniaturization of the mechanism for performing blur correction, and also favorably correct aberration produced when correcting blur.

It should be noted that in the zoom lens according to an embodiment of the present invention, it is more desirable to set the range of conditional expression (1) to the range of the following conditional expression (1)':

$$0.5<(1-\beta kFW)\cdot \beta kRW<1.5. \tag{1}'$$

When the zoom lens satisfies conditional expression (1)', it is possible to make the amount of movement of the positive lens smaller to thereby achieve further miniaturization of the mechanism for performing blur correction, and also more favorably correct aberration produced when correcting blur.

In the zoom lens according to an embodiment of the present invention, it is desirable to satisfy the following conditional expression (2):

$$1.5<fk/f3<4.0 \tag{2}$$

where
fk is the focal length of the positive lens arranged closest to the object side in the third lens group, and
f3 is the focal length of the third lens group.

Conditional expression (2) is an expression that defines the ratio in refractive power between the positive lens arranged closest to the object side in the third lens group, and the third lens group.

A value below the lower limit of conditional expression (2) causes the refractive power of the positive lens to become too strong. Thus, the weight of the blur correcting lens becomes large, and so does the size of the actuator for operating the blur correcting lens. Moreover, it becomes hard to correct spherical aberration or chromatic aberration when correcting blur.

Conversely, a value above the upper limit of conditional expression (2) causes the refractive power of the positive lens to become too weak. Thus, the amount of movement of the positive lens necessary for performing blur correction becomes large, and so does the size of the blur correction mechanism.

Therefore, when the zoom lens satisfies conditional expression (2), it is possible to make the weight of the blur correcting lens small to thereby achieve miniaturization of the actuator for operating the blur correcting lens, and also make the amount of movement of the positive lens for performing blur correction small to thereby achieve miniaturization of the blur correction mechanism.

It should be noted that in the zoom lens according to an embodiment of the present invention, it is more desirable to set the range of conditional expression (2) to the range of the following conditional expression (2)':

$$1.8<fk/f3<2.5. \tag{2}'$$

When the zoom lens satisfies conditional expression (2)', it is possible to make the weight of the blur correcting lens smaller to thereby achieve further miniaturization of the actuator for operating the blur correcting lens, and also make the amount of movement of the positive lens for performing blur correction smaller to thereby achieve further miniaturization of the blur correction mechanism.

In the zoom lens according to an embodiment of the present invention, it is desirable that the third lens group include the positive lens arranged on the object side of an aperture stop, and a lens group arranged on the image side of the aperture stop and having positive refractive power.

When the positive lens that functions as a blur correcting lens is arranged closest to the object side in the third lens group and closer to the object side than the aperture stop, the blur correcting lens can be arranged closest to the object side of a cam cylinder (lens holding member), thereby making it possible to secure a sufficient space for arranging the blur correction mechanism.

In the zoom lens according to an embodiment of the present invention, it is desirable that the zoom lens further include a fourth lens group arranged on the image side of the third lens group and having negative refractive power, the fourth lens group being moved in the optical axis direction to perform focusing, and a fifth lens group arranged on the image side of the fourth lens group and having positive refractive power, and that the following conditional expression (3) be satisfied:

$$2.5<(1-\beta G4t)^2\cdot(\beta G4t)^2<5.0, \tag{3}$$

where $\beta G4t$ is the lateral magnification of the fourth lens group, and $\beta G5t$ is the lateral magnification of the fifth lens group.

By using the fourth lens group as a focusing lens group, the focusing lens group becomes lightweight due to the small effective diameter of the fourth lens group. It is thus possible to miniaturize the actuator for operating the focusing lens group, thereby achieving miniaturization of the zoom lens.

Moreover, by using the fourth lens group having negative refractive power as a focusing lens group, the amount of movement necessary for focusing becomes small due to high eccentricity sensitivity, thereby achieving miniaturization of the zoom lens.

Conditional expression (3) is an expression that defines the sensitivity of the focusing lens group to eccentricity. A value below the lower limit of conditional expression (3) makes the amount of movement necessary for focusing too small, causing the movement accuracy of focusing to become extremely high.

Conversely, a value above the upper limit of conditional expression (3) makes the amount of movement necessary for focusing too large, leading to increased size of the zoom lens.

Therefore, when the zoom lens satisfies conditional expression (3), the amount of movement necessary for focusing is optimized, thereby making it possible to prevent the movement accuracy of focusing from becoming unnecessarily high and also achieve miniaturization.

In the zoom lens according to an embodiment of the present invention, it is desirable that the fourth lens group include only a single negative lens.

When the fourth lens group includes only a single negative lens, the focusing lens group becomes lightweight, thereby achieving miniaturization of the actuator for operating the focusing lens group.

[Numerical Examples of Zoom Lens]

Hereinbelow, a zoom lens according to each of specific embodiments of the present invention, and numerical examples in which specific numerical values are applied to the embodiments will be described with reference to the drawings and tables.

It should be noted that the meanings of symbols, and the like illustrated in the following tables and description are as follows.

"Surface No." denotes the i-th surface as counted from the objected side to the image side, "R" denotes the radius of curvature of the i-th surface, "D" denotes the on-axis surface spacing (the thickness or air spacing between the centers of the lenses) between the i-th surface and the (i+1)-th surface, "Nd" denotes the refractive index at d-line ($\lambda$=587.6 nm) of a lens or the like beginning with the i-th surface, and "vd" denotes the Abbe number at d-line of the lens or the like beginning with the i-th surface.

With regard to the "Surface No.", "ASP" indicates that the surface in question is an aspherical surface. With regard to the "Curvature radius R", "INF" indicates that the surface in question is a flat surface. With regard to the "Surface spacing D", "Di" denotes a variable spacing.

"K" denotes a conic constant, and "A4", "A6", "A8", and "A10" denote aspherical coefficients of the 4th, 6th, 8th, and 10th orders, respectively.

"f" denotes the focal length of the entire lens system, "Fno" denotes F-number (maximum aperture), and "co" denotes a half angle of view.

It should be noted that in the following tables illustrating aspherical coefficients, "E-n" denotes an exponential notation with a base of 10, that is, "the negative n-th power of 10". For example, "0.12345E-05" represents "0.12345×(the negative n-th power of 10)".

Some lens surfaces of the zoom lenses used in the embodiments are formed as aspherical surfaces. Letting "x" be the distance from the vertex of the lens surface in the optical axis direction, "y" be the height in the direction perpendicular to the optical axis, "c" be the paraxial curvature at the lens vertex, the aspherical shape is defined by the following Equation 1:

$$x = cy^2/1 + \{1-(1+K)c^2y^2\}^{1/2} + \Sigma A i y^i \quad \text{[Eq. 1]}$$

In the following embodiments, zoom lenses 1, 2, and 3 each have a five-group structure including first to fifth lens groups G1 to G5, and a zoom lens 4 has a three-group structure including first to third lens groups G1 to G3.

In the zoom lenses 1, 2, 3, and 4, when zooming from the wide-angle end state to the telephoto end state, the first lens moves to the object side, and spacings between the lens groups change.

<First Embodiment>

FIG. 1 shows the lens configuration of a zoom lens 1 according to a first embodiment.

The zoom ratio of the zoom lens 1 is set to 2.89 times.

The zoom lens 1 is made up of a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from the object side to the image side.

In the zoom lens 1, focusing is done as the fourth lens group G4 is moved in the optical axis direction.

The first lens group G1 is made up of a cemented lens including a negative meniscus lens L1 whose convex surface faces the object side and a positive meniscus lens L2 arranged on the image side of the negative meniscus lens L1 and whose convex surface faces the object side.

The second lens group G2 is made up of a negative meniscus lens L3 whose convex surface faces the object side, a biconcave lens L4, and a biconvex lens L5, which are arranged in order from the object side to the image side.

The third lens group G3 is made up of a positive meniscus lens L6 whose convex surface faces the object side, a cemented lens including a biconvex lens L7 and a negative meniscus lens L8 arranged on the image side of the biconvex lens L7 and whose concave surface faces the object side, and a positive meniscus lens L9 whose concave surface faces the object side, which are arranged in order from the object side to the image side.

The fourth lens group G4 includes a negative meniscus lens L10 whose convex surface faces the object side.

The fifth lens group G5 includes a positive meniscus lens L11 whose convex surface faces the object side.

The first to fifth lens groups G1 to G5 are all configured as movable lens groups that are moved in the optical axis direction during zooming.

An aperture stop S is arranged between the positive meniscus lens L6 and the biconvex lens L7 in the third lens group G3.

An image plane IP is arranged on the image side of the fifth lens group G5.

Table 1 shows lens data according to Numerical Example 1 in which specific numerical values are applied to the zoom lens 1 according to the first embodiment.

TABLE 1

| Surface No. | | R | D | N d | v d |
|---|---|---|---|---|---|
| | 1 | 31.253 | 1.478 | 1.84666 | 23.78 |
| | 2 | 25.183 | 5.771 | 1.72916 | 54.66 |
| | 3 | 151.048 | D 3 | | |
| | 4 | 54.338 | 1.000 | 1.910823 | 35.25 |
| | 5 | 9.548 | 5.665 | | |
| (ASP) | 6 | −31.233 | 1.100 | 1.851348 | 40.10 |
| | 7 | 32.568 | 0.400 | | |
| | 8 | 22.165 | 2.835 | 1.92286 | 20.88 |
| | 9 | −136.224 | D 9 | | |
| | 10 | 23.250 | 1.695 | 1.618 | 63.39 |
| | 11 | 949.971 | 2.000 | | |
| (Aperture stop) | 12 | INF | 2.181 | | |
| | 13 | 18.811 | 3.365 | 1.48749 | 70.45 |
| | 14 | −15.181 | 1.000 | 1.805181 | 25.46 |
| | 15 | −48.635 | 1.736 | | |
| (ASP) | 16 | −36.032 | 2.222 | 1.72903 | 54.04 |
| | 17 | −14.698 | D 17 | | |
| (ASP) | 18 | 237.858 | 1.000 | 1.851348 | 40.10 |
| (ASP) | 19 | 16.414 | D 19 | | |
| | 20 | 31.209 | 3.060 | 1.58144 | 40.89 |
| | 21 | INF | D 21 | | |

In the zoom lens 1, the object-side surface (the 6th surface) of the biconcave lens L4 in the second lens group G2, the object-side surface (the 16th surface) of the positive meniscus lens L9 in the third lens group G3, and both the surfaces (the 18th surface and the 19th surface) of the negative meniscus lens L10 in the fourth lens group G4 are formed as aspherical surfaces. Table 2 shows aspherical coefficients A4, A6, A8, and A10 of the 4th, 6th, 8th, and 10th orders of the aspherical surfaces in Numerical Example 1, together with conic constants K.

TABLE 2

| Surface No. | κ | A 4 | A 6 | A 8 | A 10 |
|---|---|---|---|---|---|
| 6 | 0.00000E+00 | −7.49645E−06 | −7.70344E−08 | 6.67223E−10 | −1.38051E−11 |
| 16 | 0.00000E+00 | −1.24878E−04 | 1.87829E−07 | −1.51018E−09 | −1.96142E−11 |
| 18 | 0.00000E+00 | −5.85209E−06 | −8.97199E−07 | 1.91120E−08 | −1.26629E−10 |
| 19 | 0.00000E+00 | −3.28062E−05 | −6.60272E−07 | 1.86921E−08 | −1.24801E−10 |

In the zoom lens 1, when zooming from the wide-angle end state to the telephoto end state, a surface spacing D3 between the first lens group G1 and the second lens group G2, a surface spacing D9 between the second lens group G2 and the third lens group G3, a surface spacing D17 between the third lens group G3 and the fourth lens group G4, a surface spacing D19 between the fourth lens group G4 and the fifth lens group G5, and a surface spacing D21 between the fifth lens group G5 and the image plane IP change. Table 3 shows the respective surface spacings in the wide-angle end state (f=18.49), the medium focal length state (f=27.38), and the telephoto end state (f=53.51) in Numerical Example 1, together with focal lengths f, F-numbers Fno, and half angles of view ω.

TABLE 3

| f | 18.49 | 27.38 | 53.51 |
|---|---|---|---|
| Fno | 3.74 | 4.15 | 5.62 |
| ω | 38.86 | 27.02 | 14.71 |
| D3 | 1.108 | 6.032 | 13.437 |
| D9 | 12.384 | 6.481 | 1.600 |
| D17 | 5.510 | 6.071 | 2.887 |
| D19 | 6.841 | 6.280 | 9.465 |
| D21 | 40.350 | 15.537 | 19.989 |

Figure 2:
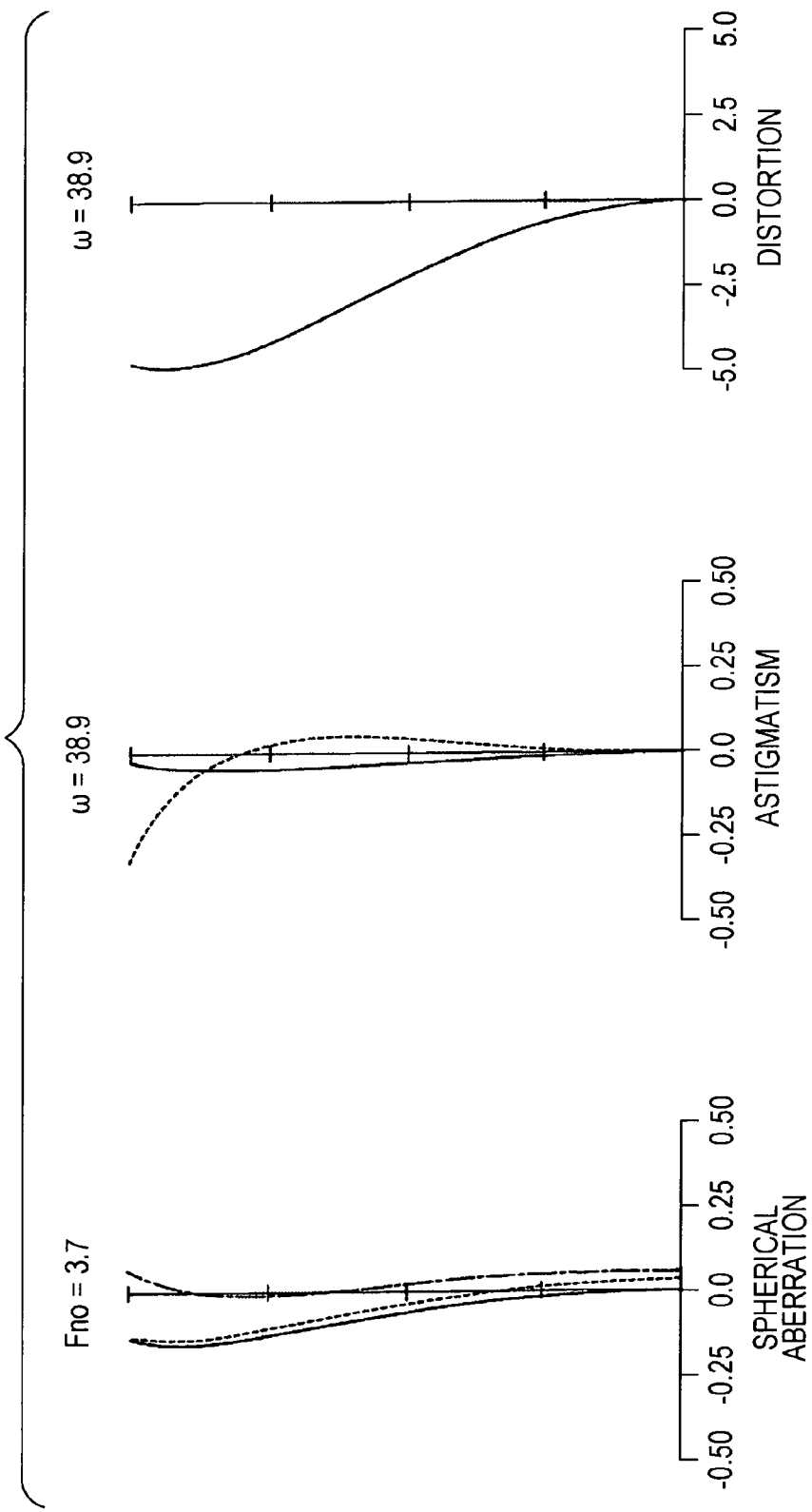
FIG. 2 is an aberration diagram showing, together with FIG. 3 and FIG. 4, aberrations according to a numerical example in which specific numerical values are applied to the first embodiment, illustrating spherical aberration, astigmatism, and distortion in the wide-angle end state.
Figure 3:
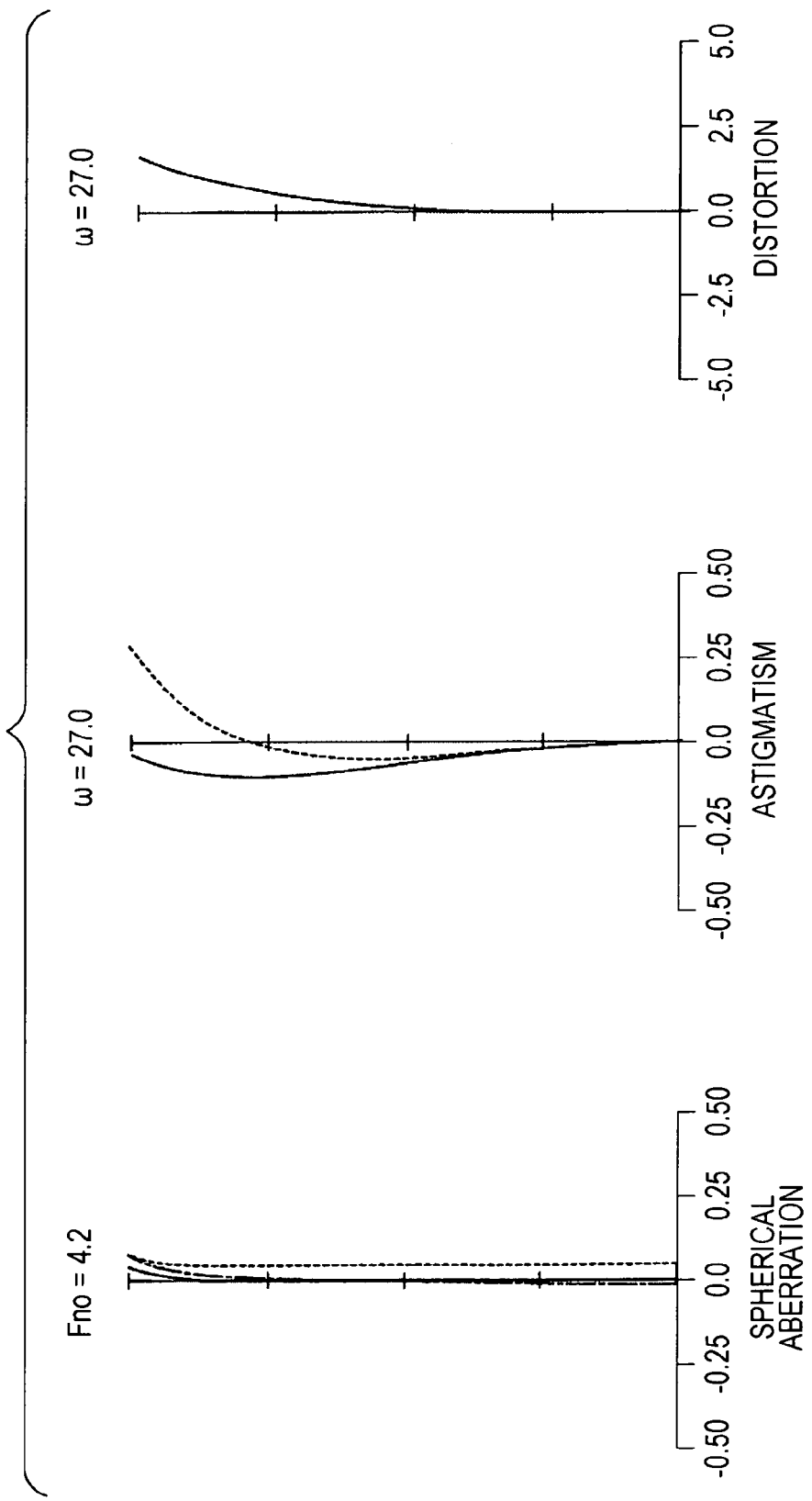
FIG. 3 is a diagram showing spherical aberration, astigmatism, and distortion in the medium focal length state.
Figure 4:
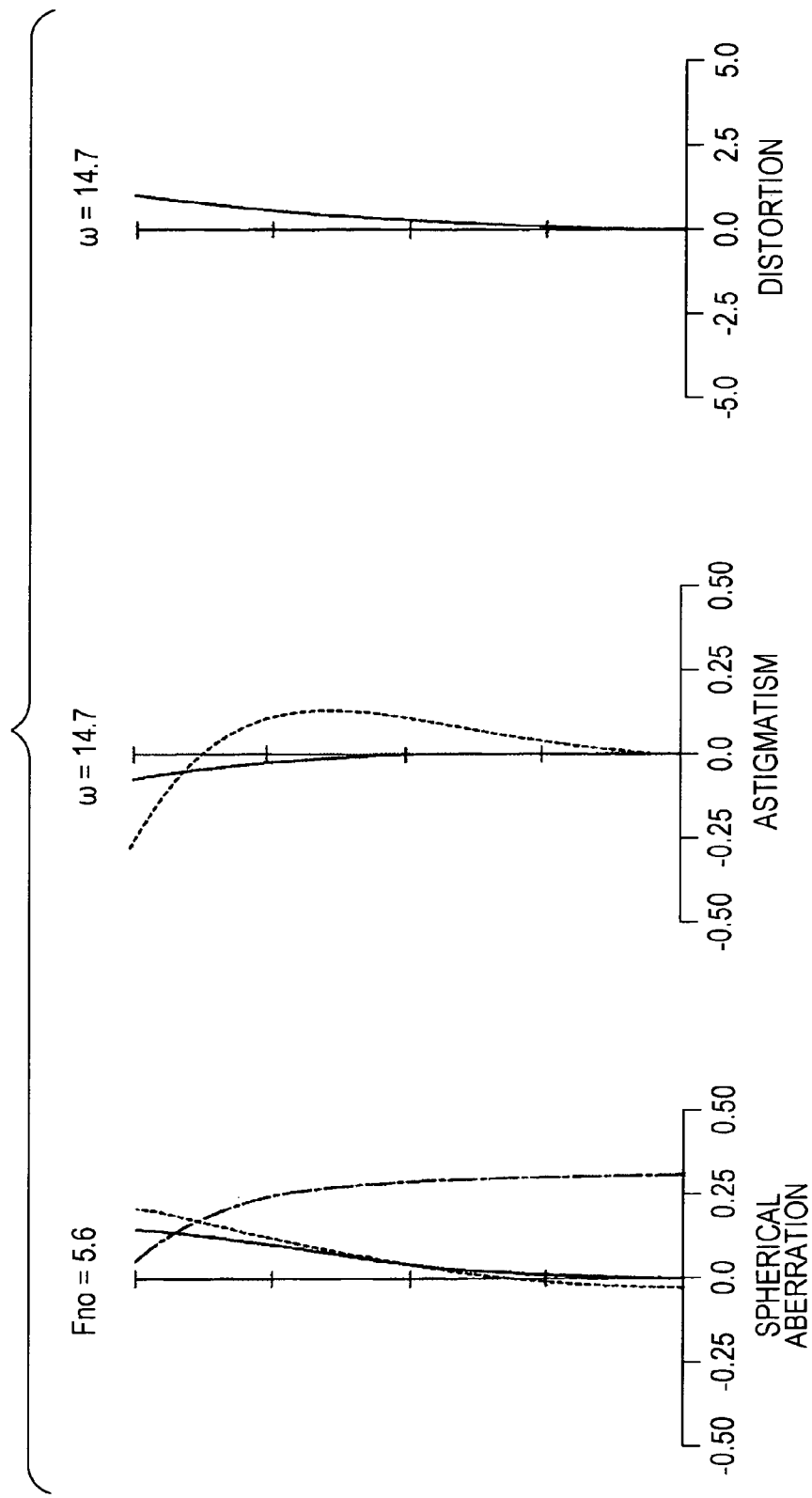
FIG. 4 is a diagram showing spherical aberration, astigmatism, and distortion in the telephoto end state.

FIGS. 2 to 4 are various aberration diagrams when in focus at infinity according to Numerical Example 1. FIGS. 2, 3, and 4 are each a spherical aberration diagram, an astigmatism diagram, and a distortion diagram in the wide-angle end state, the medium focal length state, and the telephoto end state, respectively.

In each of FIGS. 2 to 4, in the spherical aberration diagram, the solid line, the alternate long and short dash line, and the dotted line indicate the values for the d-line (wavelength: 587.6 nm), the g-line (wavelength: 435.8 nm), and the C-line (wavelength: 656.3 nm), respectively. In the astigmatism diagram, the solid line and the dotted line indicate the value in the sagittal image plane, and the value in the meridional image plane, respectively.

It is apparent from the aberration diagrams that various aberrations are favorably corrected for in Numerical Example 1, thus providing excellent image-forming performance.

<Second Embodiment>

Figure 5:
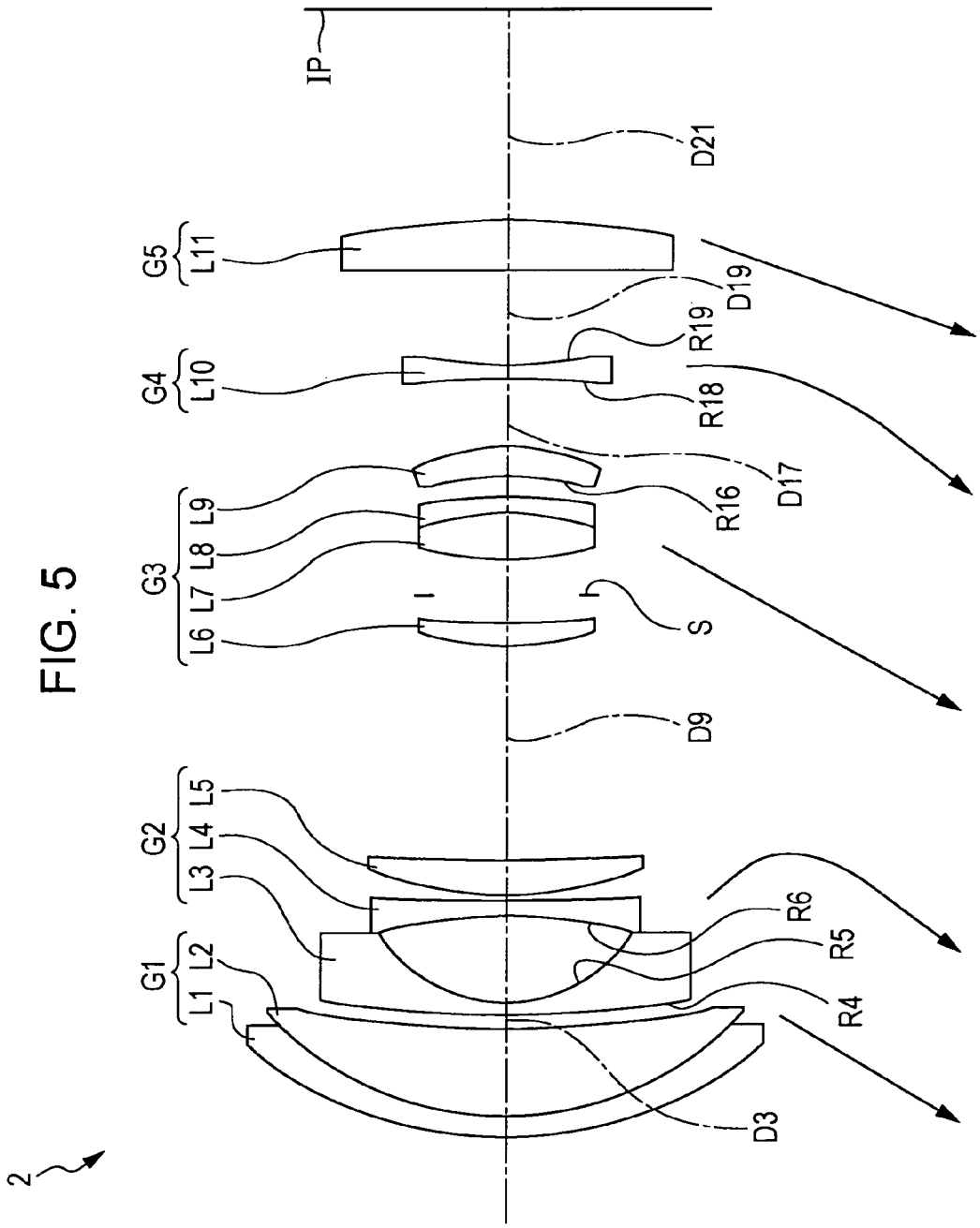
FIG. 5 is a diagram showing the lens configuration of a zoom lens according to a second embodiment.

FIG. 5 shows the lens configuration of a zoom lens 2 according to a second embodiment.

The zoom ratio of the zoom lens 2 is set to 2.90 times.

The zoom lens 2 is made up of a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from the object side to the image side.

In the zoom lens 2, focusing is done as the fourth lens group G4 is moved in the optical axis direction.

The first lens group G1 is made up of a cemented lens including a negative meniscus lens L1 whose convex surface faces the object side and a positive meniscus lens L2 arranged on the image side of the negative meniscus lens L1 and whose convex surface faces the object side.

The second lens group G2 is made up of a negative meniscus lens L3 whose convex surface faces the object side, a biconcave lens L4, and a biconvex lens L5, which are arranged in order from the object side to the image side.

The third lens group G3 is made up of a positive meniscus lens L6 whose convex surface faces the object side, a cemented lens including a biconvex lens L7 and a negative meniscus lens L8 arranged on the image side of the biconvex lens L7 and whose concave surface faces the object side, and a positive meniscus lens L9 whose concave surface faces the object side, which are arranged in order from the object side to the image side.

The fourth lens group G4 includes a biconcave lens L10.

The fifth lens group G5 includes a biconvex lens L11.

The first to fifth lens-groups G1 to G5 are all configured as movable lens groups that are moved in the optical axis direction during zooming.

An aperture stop S is arranged between the positive meniscus lens L6 and the biconvex lens L7 in the third lens group G3.

An image plane IP is arranged on the image side of the fifth lens group G5.

Table 4 shows lens data according to Numerical Example 2 in which specific numerical values are applied to the zoom lens 2 according to the second embodiment.

TABLE 4

| | Surface No. | R | D | N d | ν d |
|---|---|---|---|---|---|
| | 1 | 25.357 | 1.400 | 1.84666 | 23.78 |
| | 2 | 20.335 | 6.219 | 1.72916 | 54.66 |
| | 3 | 61.125 | D 3 | | |
| (ASP) | 4 | 127.520 | 1.000 | 1.85135 | 40.10 |
| (ASP) | 5 | 9.669 | 6.000 | | |
| (ASP) | 6 | −43.779 | 1.100 | 1.85135 | 40.10 |
| | 7 | 88.773 | 0.400 | | |
| | 8 | 22.181 | 2.500 | 2.00272 | 19.32 |
| | 9 | 87.371 | D 9 | | |
| | 10 | 16.971 | 1.656 | 1.61800 | 63.39 |
| | 11 | 57.653 | 2.000 | | |
| (Aperture stop) | 12 | INF | 2.511 | | |
| | 13 | 19.171 | 3.411 | 1.48749 | 70.45 |
| | 14 | −14.887 | 1.000 | 1.80518 | 25.46 |
| | 15 | −45.735 | 1.500 | | |
| (ASP) | 16 | −27.642 | 2.122 | 1.72903 | 54.04 |
| | 17 | −13.762 | D 17 | | |
| (ASP) | 18 | −75.127 | 1.000 | 1.85135 | 40.10 |
| (ASP) | 19 | 29.680 | D 19 | | |
| | 20 | 343.456 | 3.487 | 1.69895 | 30.05 |
| | 21 | −62.745 | D 21 | | |

In the zoom lens 2, both the surfaces (the 4th surface and the 5th surface) of the negative meniscus lens L3 in the second lens group G2, the object-side surface (the 6th surface) of the biconcave lens L4 in the second lens group G2, the object-side surface (the 16th surface) of the positive meniscus lens L9 in the third lens group G3, and both the surfaces (the 18th surface and the 19th surface) of the biconcave lens L10 in the fourth lens group G4 are formed as aspherical surfaces. Table 5 shows aspherical coefficients A4, A6, A8, and A10 of the 4th, 6th, 8th, and 10th orders of the aspherical surfaces in Numerical Example 2, together with conic constants K.

TABLE 5

| Surface No. | κ | A 4 | A 6 | A 8 | A 10 |
|---|---|---|---|---|---|
| 4 | 0.00000E+00 | 4.00061E−05 | −7.67761E−08 | 0.00000E+00 | 0.00000E+00 |
| 5 | 0.00000E+00 | −1.65938E−05 | 9.94241E−08 | 0.00000E+00 | 0.00000E+00 |
| 6 | 0.00000E+00 | −3.31839E−05 | 6.66204E−08 | −2.01801E−09 | 2.22232E−11 |
| 16 | 0.00000E+00 | −1.52154E−04 | 2.75708E−07 | −2.84654E−09 | 4.97332E−11 |
| 18 | 0.00000E+00 | 7.76634E−05 | −3.35288E−06 | 5.51823E−08 | −6.05766E−10 |
| 19 | 0.00000E+00 | 5.67369E−05 | −2.87046E−06 | 5.05818E−08 | −4.77272E−10 |

In the zoom lens 2, when zooming from the wide-angle end state to the telephoto end state, a surface spacing D3 between the first lens group G1 and the second lens group G2, a surface spacing D9 between the second lens group G2 and the third lens group G3, a surface spacing D17 between the third lens group G3 and the fourth lens group G4, a surface spacing D19 between the fourth lens group G4 and the fifth lens group G5, and a surface spacing D21 between the fifth lens group G5 and the image plane IP change. Table 6 shows the respective surface spacings in the wide-angle end state (f=18.46), the medium focal length state (f=27.02), and the telephoto end state (f=53.50) in Numerical Example 2, together with focal lengths f, F-numbers Fno, and half angles of view ω.

TABLE 6

| F | 18.46 | 27.02 | 53.50 |
|---|---|---|---|
| Fno | 3.58 | 3.96 | 5.23 |
| ω | 39.17 | 27.92 | 14.70 |
| D3 | 1.000 | 6.410 | 14.039 |
| D9 | 15.173 | 8.900 | 2.237 |
| D17 | 4.778 | 4.922 | 2.000 |
| D19 | 6.736 | 6.592 | 9.514 |
| D21 | 15.000 | 19.042 | 36.289 |

Figure 6:
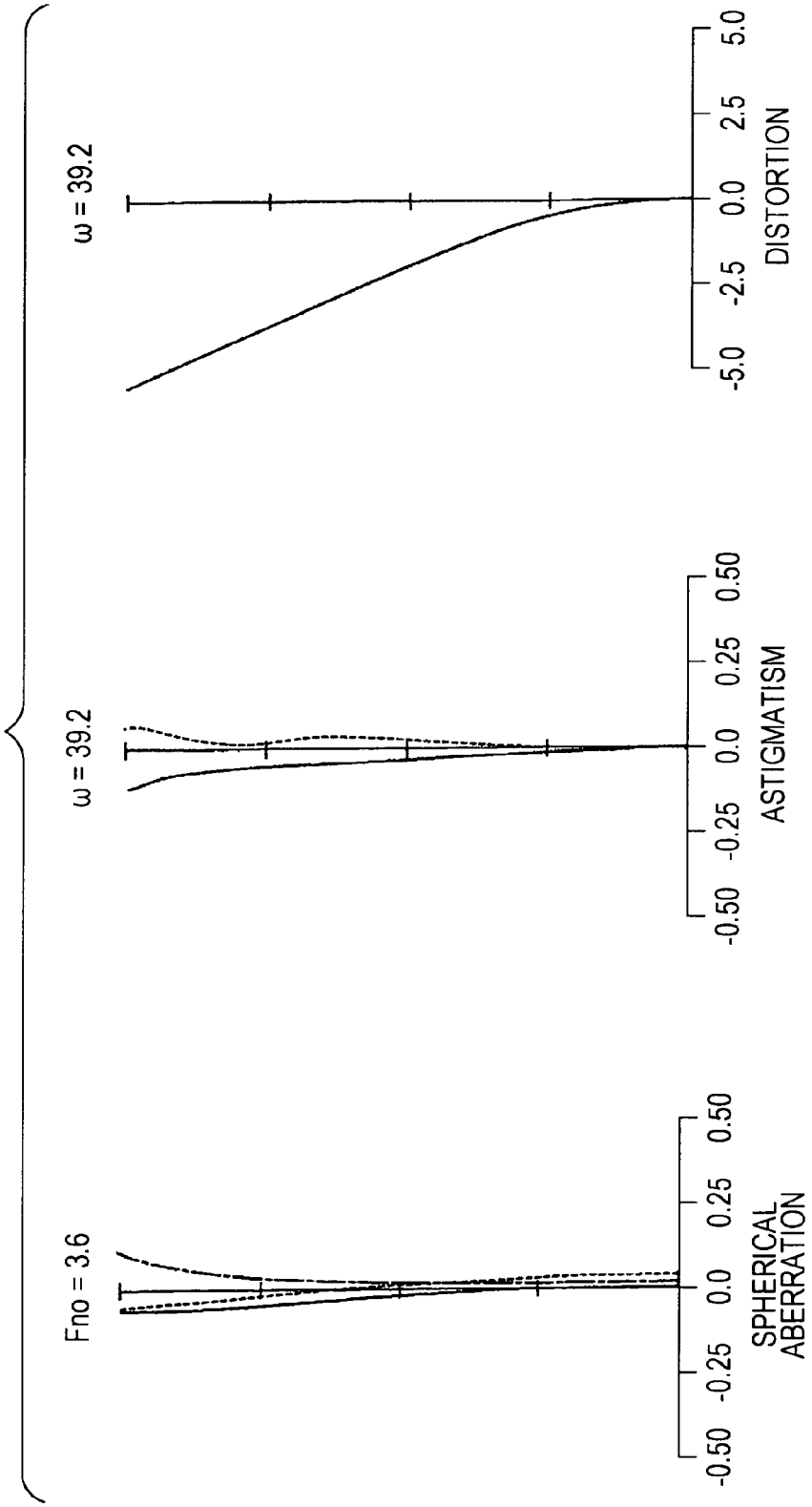
FIG. 6 is an aberration diagram showing, together with FIG. 7 and FIG. 8, aberrations according to a numerical example in which specific numerical values are applied to the second embodiment, illustrating spherical aberration, astigmatism, and distortion in the wide-angle end state.
Figure 7:
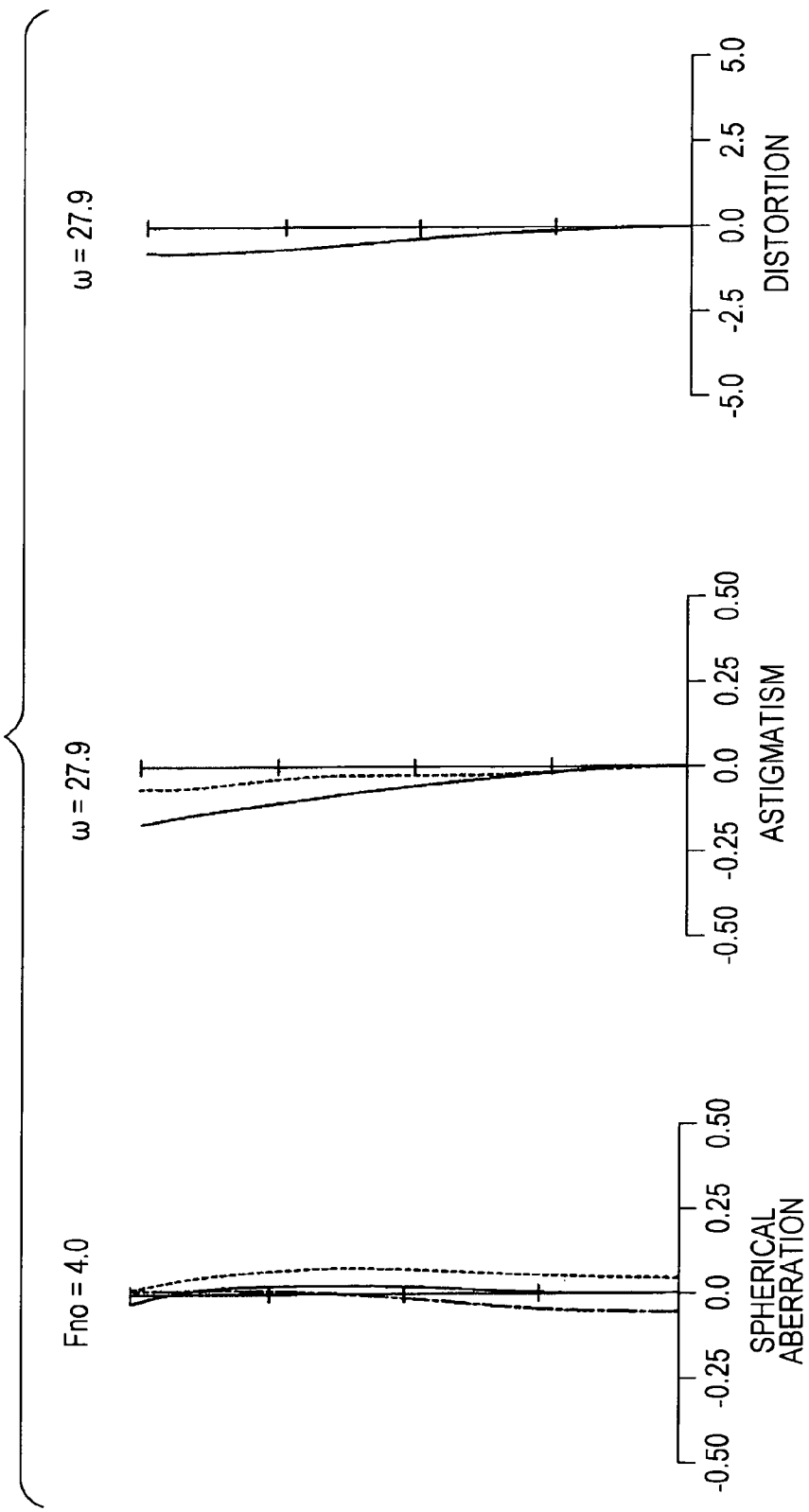
FIG. 7 is a diagram showing spherical aberration, astigmatism, and distortion in the medium focal length state.
Figure 8:
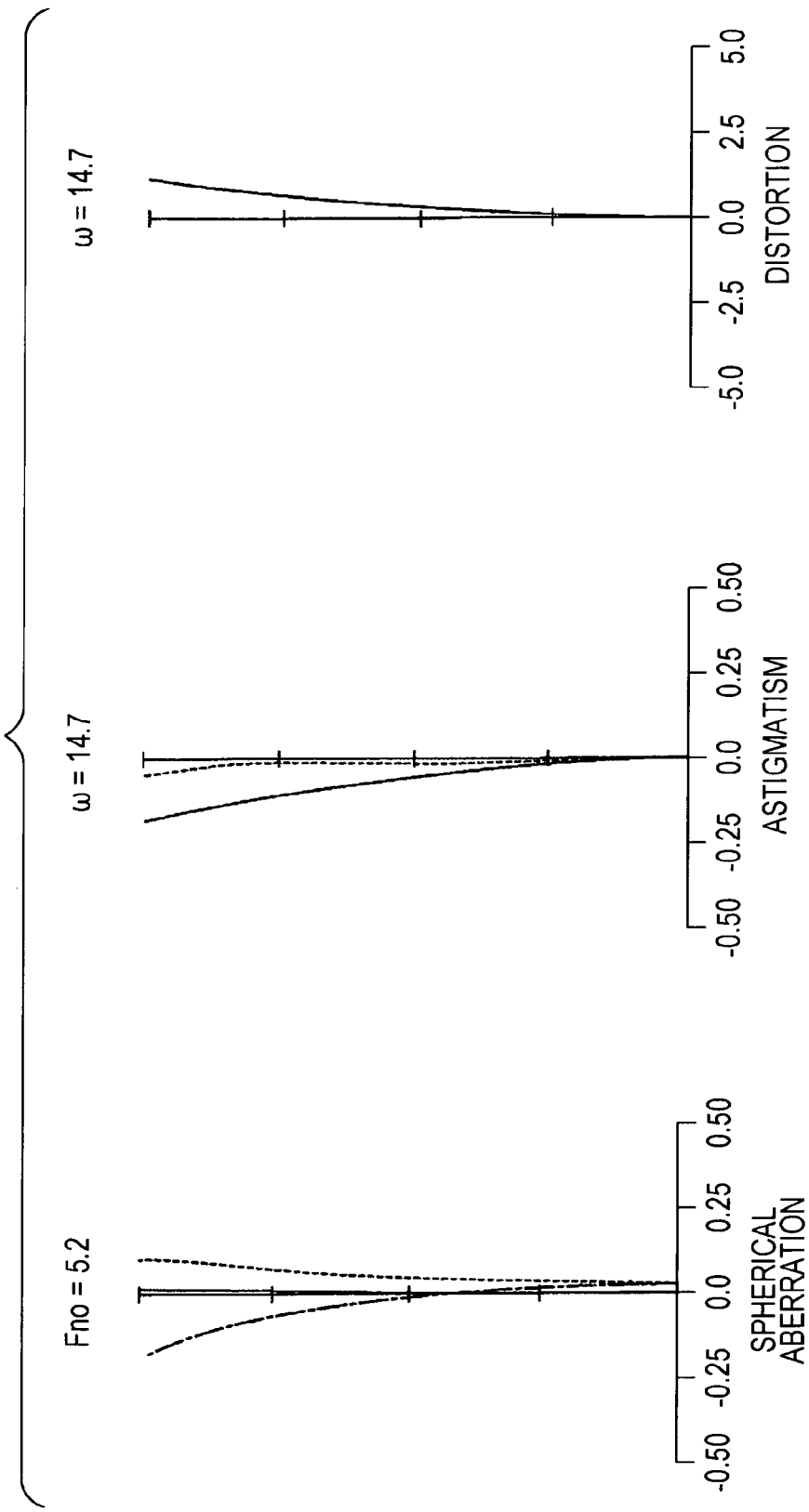
FIG. 8 is a diagram showing spherical aberration, astigmatism, and distortion in the telephoto end state.

FIGS. 6 to 8 are various aberration diagrams when in focus at infinity according to Numerical Example 2. FIGS. 6, 7, and 8 are each a spherical aberration diagram, an astigmatism diagram, and a distortion diagram in the wide-angle end state, the medium focal length state, and the telephoto end state, respectively.

In each of FIGS. 6 to 8, in the spherical aberration diagram, the solid line, the alternate long and short dash line, and the dotted line indicate the values for the d-line (wavelength: 587.6 nm), the g-line (wavelength: 435.8 nm), and the C-line (wavelength: 656.3 nm), respectively. In the astigmatism diagram, the solid line and the dotted line indicate the value in the sagittal image plane, and the value in the meridional image plane, respectively.

It is apparent from the aberration diagrams that various aberrations are favorably corrected for in Numerical Example 2, thus providing excellent image-forming performance.

<Third Embodiment>

Figure 9:
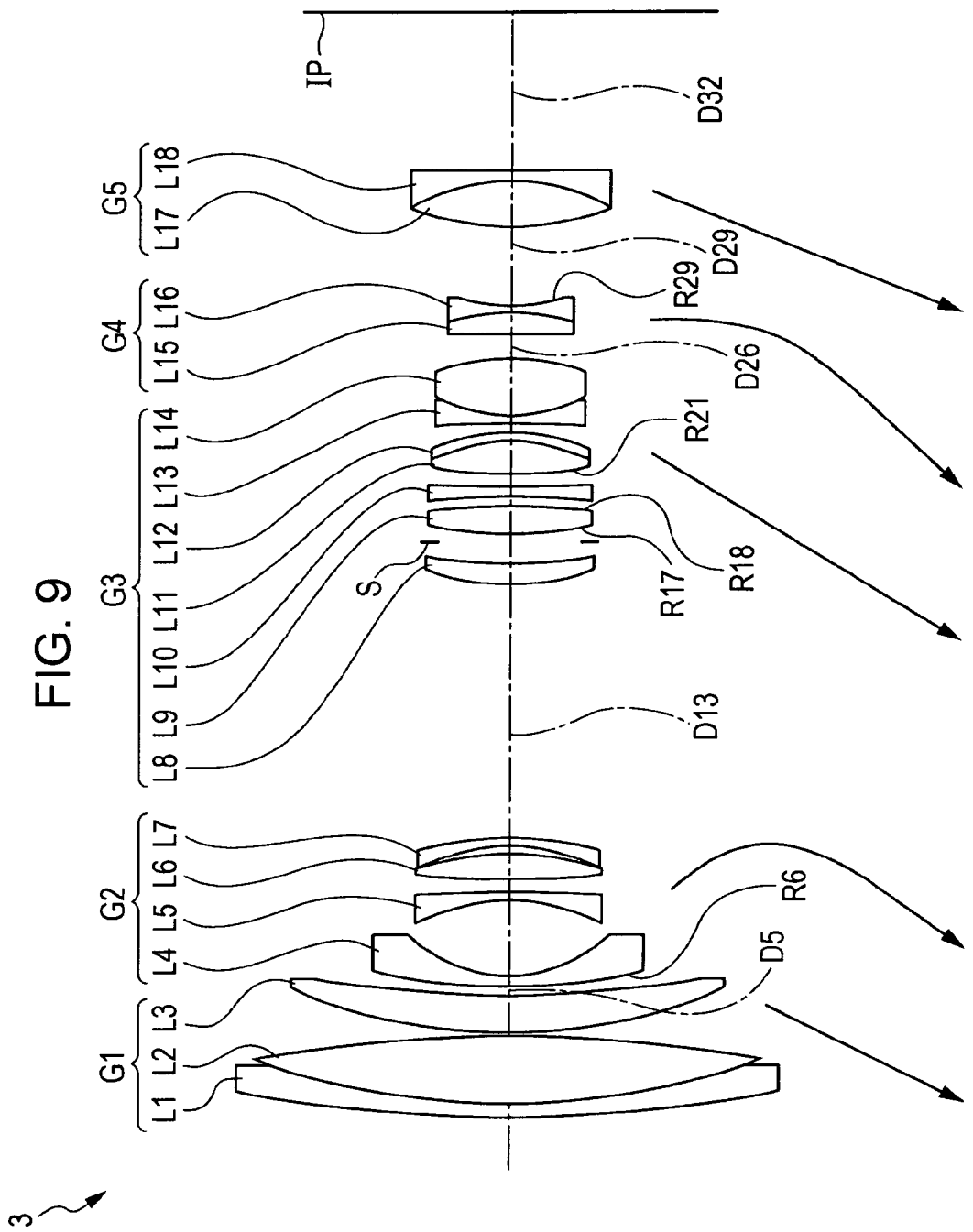
FIG. 9 is a diagram showing the lens configuration of a zoom lens according to a third embodiment.

FIG. 9 shows the lens configuration of a zoom lens 3 according to a third embodiment.

The zoom ratio of the zoom lens 3 is set to 10.50 times.

The zoom lens 3 is made up of a first lens group G1 having positive refractive power, a second lens group G2 having negative refractive power, a third lens group G3 having positive refractive power, a fourth lens group G4 having negative refractive power, and a fifth lens group G5 having positive refractive power, which are arranged in order from the object side to the image side.

In the zoom lens 3, focusing is done as the fourth lens group G4 is moved in the optical axis direction.

The first lens group G1 is made up of a cemented lens including a negative meniscus lens L1 whose convex surface faces the object side and a biconvex lens L2 arranged on the image side of the negative meniscus lens L1, and a positive meniscus lens L3 whose convex surface faces the object side, which are arranged in order from the object side to the image side.

The second lens group G2 is made up of a negative meniscus lens L4 whose convex surface faces the object side, a negative meniscus lens L5 whose concave surface faces the object side, a biconvex lens L6, and a negative meniscus lens L7 whose concave surface faces the object side, which are arranged in order from the object side to the image side.

The third lens group G3 is made up of a positive meniscus lens L8 whose convex surface faces the object side, a biconvex lens L9, a biconcave lens L10, a cemented lens including a biconvex lens L11 and a negative meniscus lens L12 arranged on the image side of the biconvex lens L11 and whose concave surface faces the object side, and a cemented lens including a biconcave lens L13 and a biconvex lens L14 arranged on the image side of the biconcave lens L13, which are arranged in order from the object side to the image side.

The fourth lens group G4 is made up of a cemented lens including a positive meniscus lens L15 whose concave surface faces the object side and a biconcave lens L16 arranged on the image side of the positive meniscus lens L15.

The fifth lens group G5 is made up of a cemented lens including a biconvex lens L17 and a negative meniscus lens L18 arranged on the image side of the biconvex lens L17 and whose concave surface faces the object side.

The first to fifth lens groups G1 to G5 are all configured as movable lens groups that are moved in the optical axis direction during zooming.

An aperture stop S is arranged between the positive meniscus lens L8 and the biconvex lens L9 in the third lens group G3.

An image plane IP is arranged on the image side of the fifth lens group G5.

Table 7 shows lens data according to Numerical Example 3 in which specific numerical values are applied to the zoom lens 3 according to the third embodiment.

TABLE 7

| | Surface No. | R | D | Nd | νd |
|---|---|---|---|---|---|
| | 1 | 136.420 | 1.500 | 1.91048 | 31.31 |
| | 2 | 69.313 | 7.000 | 1.49845 | 81.61 |
| | 3 | −179.913 | 0.300 | | |
| | 4 | 49.576 | 4.000 | 1.62032 | 63.39 |
| | 5 | 102.654 | D 5 | | |
| (ASP) | 6 | 86.376 | 1.133 | 1.85639 | 40.10 |
| | 7 | 14.351 | 7.902 | | |
| | 8 | −20.506 | 0.900 | 1.83930 | 37.34 |
| | 9 | −188.043 | 1.240 | | |
| | 10 | 82.506 | 2.821 | 1.93323 | 20.88 |
| | 11 | −31.208 | 0.891 | | |
| | 12 | −19.270 | 0.800 | 1.83944 | 42.72 |
| | 13 | −35.047 | D 13 | | |
| | 14 | 23.252 | 2.244 | 1.59489 | 68.62 |
| | 15 | 46.340 | 2.173 | | |
| (Aperture stop) | 16 | INF | 0.900 | | |
| (ASP) | 17 | 33.156 | 3.000 | 1.62112 | 63.85 |
| (ASP) | 18 | −57.976 | 1.000 | | |
| | 19 | −74.812 | 1.000 | 1.73234 | 54.67 |
| | 20 | 291.540 | 1.500 | | |
| (ASP) | 21 | 45.082 | 3.377 | 1.58547 | 59.46 |
| | 22 | −18.455 | 0.800 | 1.81643 | 22.76 |
| | 23 | −22.614 | 1.100 | | |
| | 24 | −209.366 | 0.800 | 1.91048 | 31.31 |
| | 25 | 15.301 | 5.925 | 1.51978 | 52.15 |
| | 26 | −26.920 | D 26 | | |
| | 27 | −193.333 | 2.200 | 1.81263 | 25.46 |
| | 28 | −20.904 | 0.800 | 1.69661 | 53.20 |
| (ASP) | 29 | 20.649 | D 29 | | |
| | 30 | 25.783 | 4.876 | 1.48914 | 70.44 |
| | 31 | −20.612 | 1.054 | 1.83944 | 42.72 |
| | 32 | INF | D 32 | | |

In the zoom lens 3, the object-side surface (the 6th surface) of the negative meniscus lens L4 in the second lens group G2, both the surfaces (the 17th surface and the 18th surface) of the biconvex lens L9 in the third lens group G3, the object-side surface (the 21st surface) of the biconvex lens L11 in the third lens group G3, the image-side surface (the 29th surface) of the biconcave lens L16 in the fourth lens group G4 are formed as aspherical surfaces. Table 8 shows aspherical coefficients A4, A6, A8, and A10 of the 4th, 6th, 8th, and 10th orders of the aspherical surfaces in Numerical Example 3, together with conic constants K.

TABLE 8

| Surface No. | κ | A 4 | A 6 | A 8 | A 10 |
|---|---|---|---|---|---|
| 6 | 0.00000E+00 | 1.11240E−05 | −8.26361E−09 | −2.09837E−11 | 3.27509E−13 |
| 17 | 0.00000E+00 | −1.95241E−09 | 2.20446E−08 | 2.26042E−09 | −1.74746E−11 |
| 18 | 0.00000E+00 | 1.33525E−05 | 2.72794E−07 | 1.14743E−09 | −1.30656E−11 |
| 21 | 0.00000E+00 | −2.50655E−05 | 2.76265E−07 | −1.74085E−09 | 6.62201E−12 |
| 29 | 0.00000E+00 | −6.06869E−06 | −9.15543E−09 | −9.41453E−10 | 9.41693E−12 |

In the zoom lens 3, when zooming from the wide-angle end state to the telephoto end state, a surface spacing D5 between the first lens group G1 and the second lens group G2, a surface spacing D13 between the second lens group G2 and the third lens group G3, a surface spacing D26 between the third lens group G3 and the fourth lens group G4, a surface spacing D29 between the fourth lens group G4 and the fifth lens group G5, and a surface spacing D32 between the fifth lens group G5 and the image plane IP change. Table 9 shows the respective surface spacings in the wide-angle end state (f=18.45), the medium focal length state (f=59.00), and the telephoto end state (f=193.78) in Numerical Example 3, together with focal lengths f, F-numbers Fno, and half angles of view ω.

TABLE 9

| f | 18.45 | 59.00 | 193.78 |
|---|---|---|---|
| Fno | 3.61 | 5.37 | 7.27 |
| ω | 39.30 | 13.05 | 4.10 |
| D5 | 1.000 | 27.638 | 57.186 |
| D13 | 26.867 | 7.500 | 1.700 |
| D26 | 2.771 | 6.391 | 1.400 |
| D29 | 8.463 | 4.843 | 9.834 |
| D32 | 16.843 | 34.520 | 59.324 |

Figure 10:
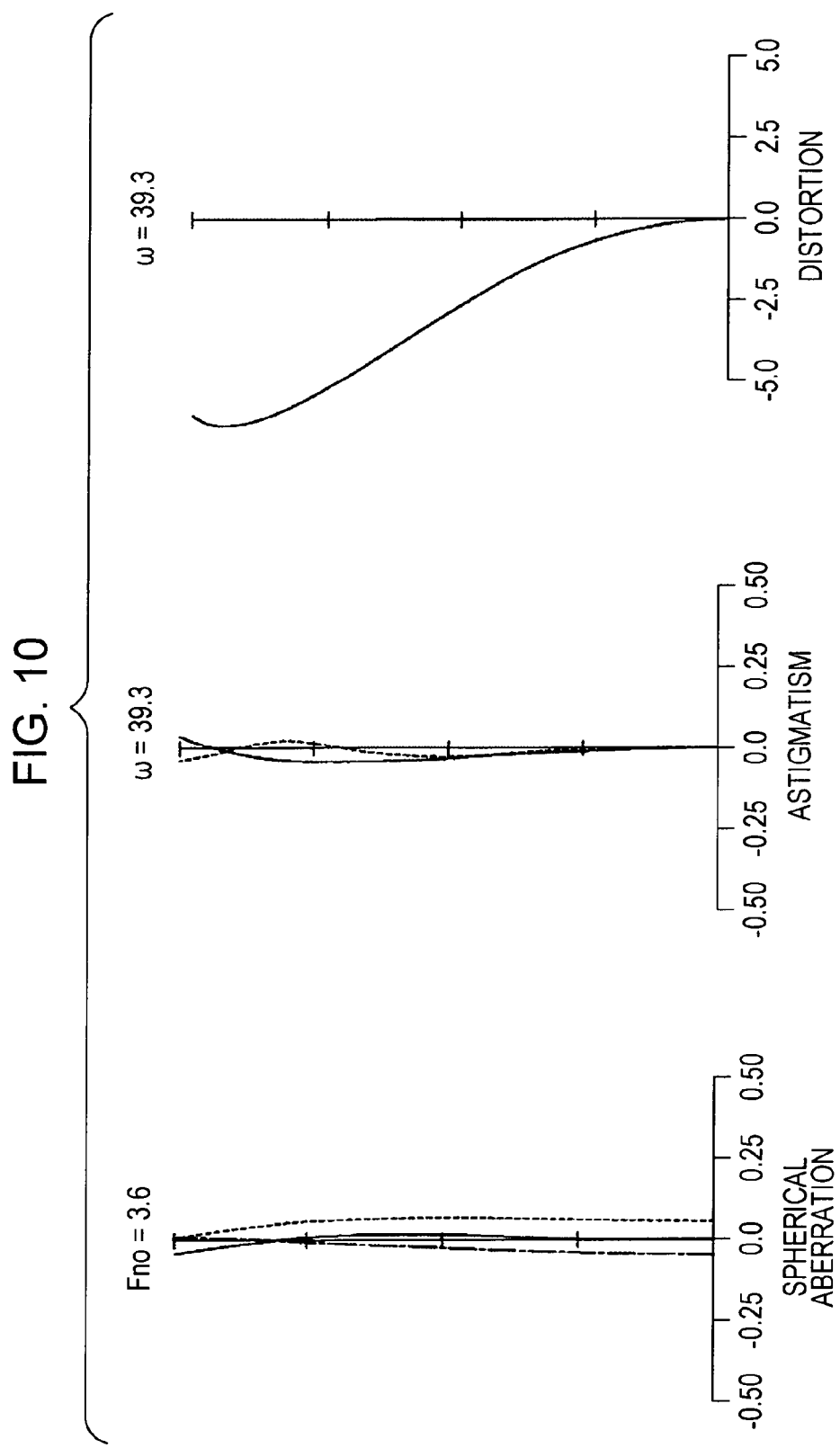
FIG. 10 is an aberration diagram showing, together with FIG. 11 and FIG. 12, aberrations according to a numerical example in which specific numerical values are applied to the third embodiment, illustrating spherical aberration, astigmatism, and distortion in the wide-angle end state.
Figure 11:
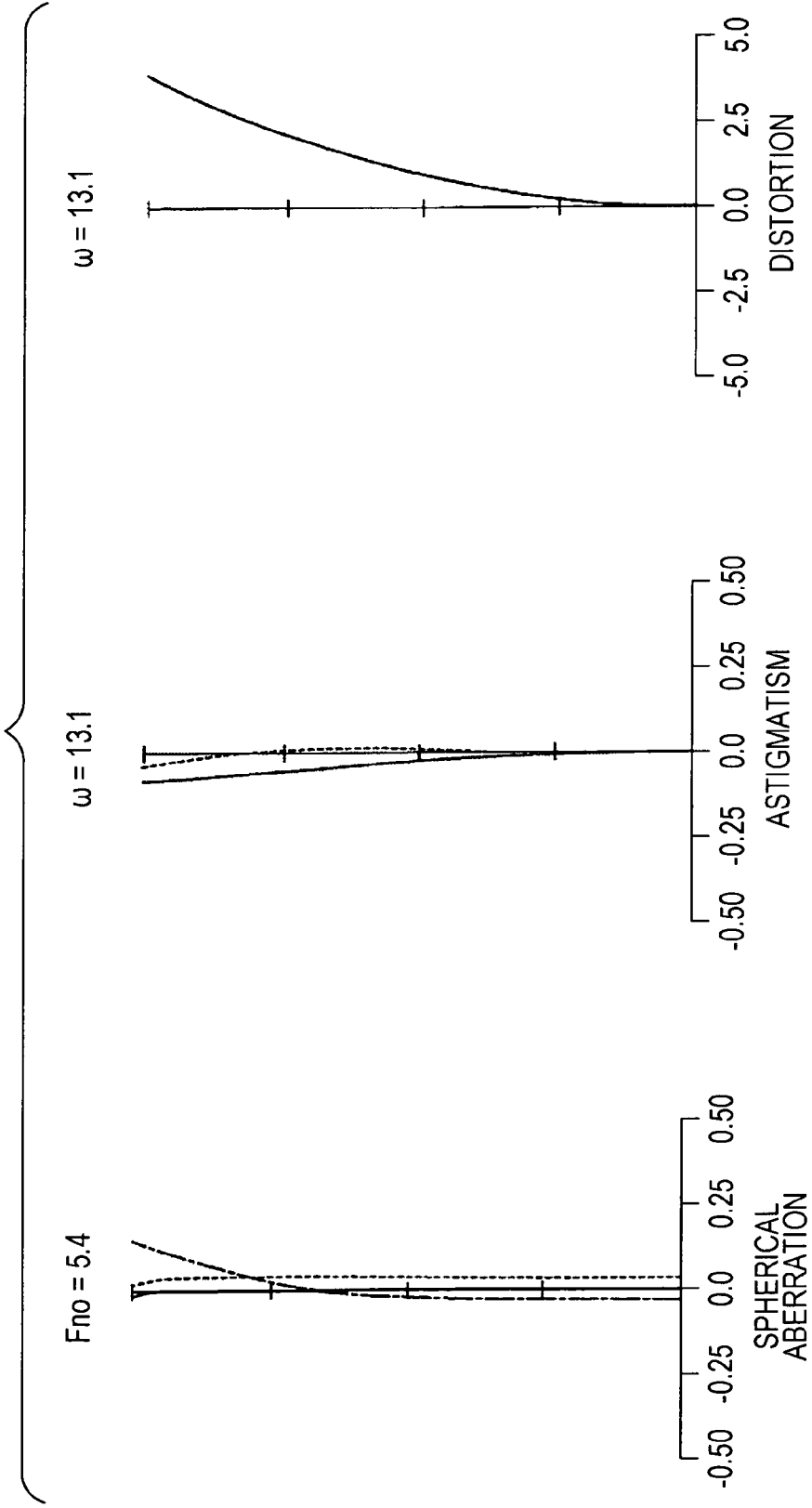
FIG. 11 is a diagram showing spherical aberration, astigmatism, and distortion in the medium focal length state.
Figure 12:
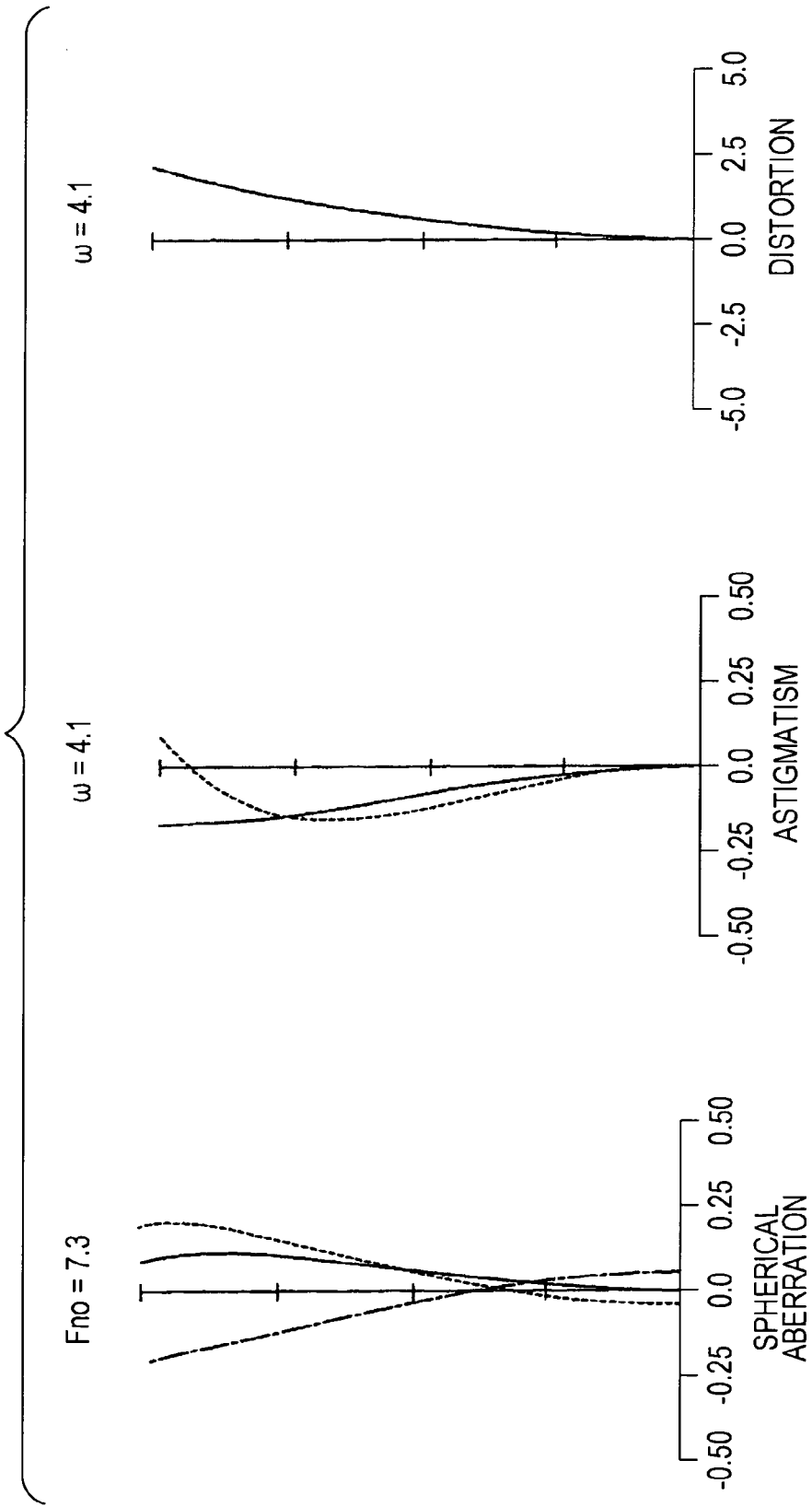
FIG. 12 is a diagram showing spherical aberration, astigmatism, and distortion in the telephoto end state.

FIGS. 10 to 12 are various aberration diagrams when in focus at infinity according to Numerical Example 3. FIGS. 10, 11, and 12 are each a spherical aberration diagram, an astigmatism diagram, and a distortion diagram in the wide-angle end state, the medium focal length state, and the telephoto end state, respectively.

In each of FIGS. 10 to 12, in the spherical aberration diagram, the solid line, the alternate long and short dash line, and the dotted line indicate the values for the d-line (wavelength: 587.6 nm), the g-line (wavelength: 435.8 nm), and the C-line (wavelength: 656.3 nm), respectively. In the astigmatism diagram, the solid line and the dotted line indicate the value in the sagittal image plane, and the value in the meridional image plane, respectively.

It is apparent from the aberration diagrams that various aberrations are favorably corrected for in Numerical Example 3, thus providing excellent image-forming performance.

<Fourth Embodiment>

Figure 13:
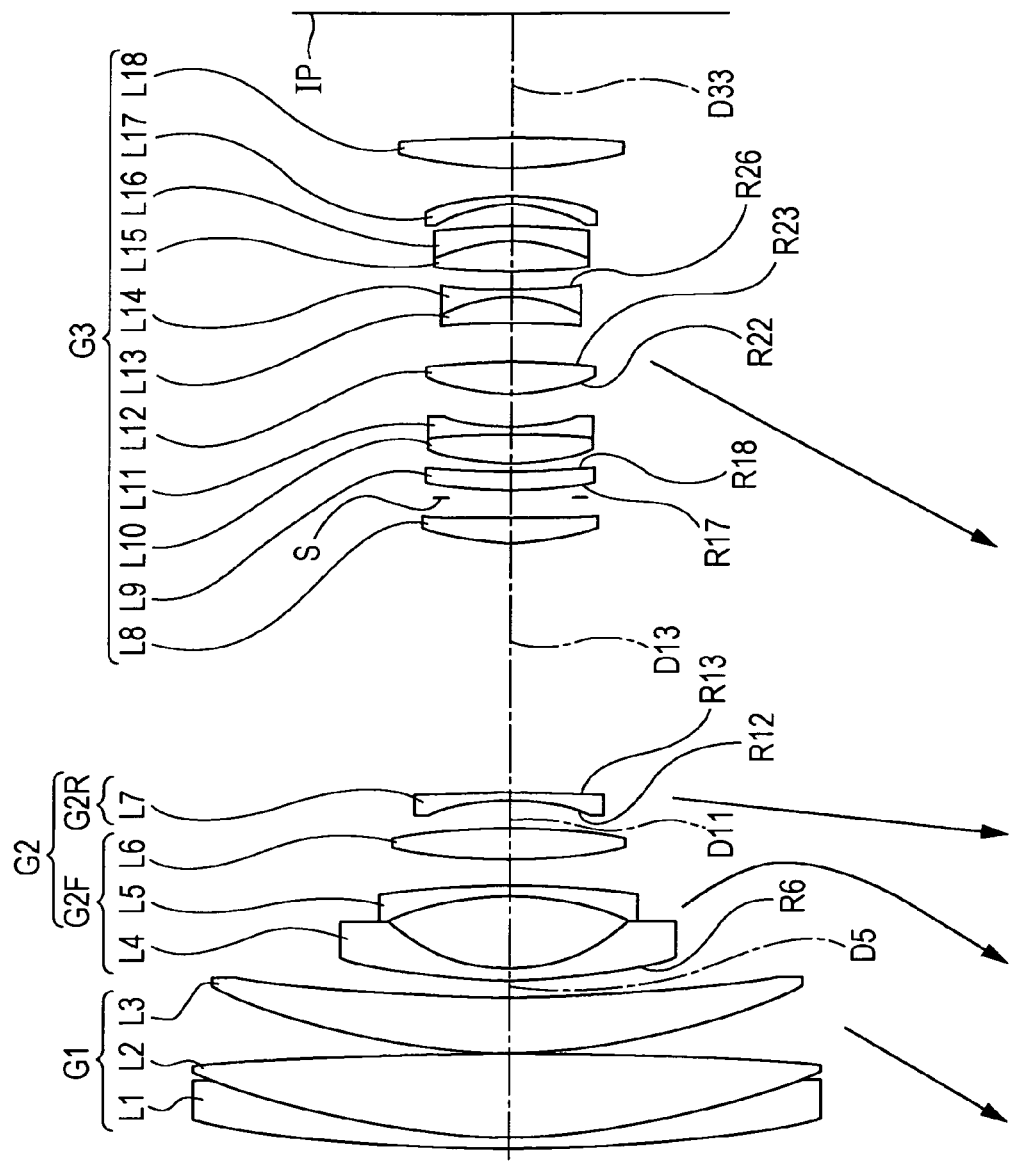
FIG. 13 is a diagram showing the lens configuration of a zoom lens according to a fourth embodiment.

FIG. 13 shows the lens configuration of a zoom lens 4 according to a fourth embodiment.

The zoom ratio of the zoom lens 4 is set to 9.55 times.

The zoom lens 4 is made up of a first lens group G1 having positive refractive power, a second lens group G2 having negative refractive power, and a third lens group G3 having positive refractive power, which are arranged in order from the object side to the image side. The second lens group G2 is made up of a front group G2F having negative refractive power and a rear group G2R arranged on the image side of the front group G2F and having negative refractive power.

In the zoom lens 4, focusing is done as the rear group G2R of the second lens group G2 is moved in the optical axis direction.

The first lens group G1 is made up of a cemented lens including a negative meniscus lens L1 whose convex surface faces the object side and a biconvex lens L2 arranged on the image side of the negative meniscus lens L1, and a positive meniscus lens L3 whose convex surface faces the object side, which are arranged in order from the object side to the image side.

The front group G2F of the second lens group G2 is made up of a negative meniscus lens L4 whose convex surface faces the object side, a negative meniscus lens L5 whose concave surface faces the object side, and a biconvex lens L6, which are arranged in order from the object side to the image side.

The rear group G2R of the second lens group G2 is made up of a negative meniscus lens L7 whose concave surface faces the object side.

The third lens group G3 is made up of a positive meniscus lens L8 whose convex surface faces the object side, a positive meniscus lens L9 whose convex surface faces the object side, a cemented lens including a biconvex lens L10 and a biconcave lens L11 arranged on the image side of the biconvex lens L10, a biconvex lens L12, a cemented lens including a positive meniscus lens L13 whose concave surface faces the object side and a biconcave lens L14 arranged on the image side of the positive meniscus lens L13, a cemented lens including a biconvex lens L15 and a negative meniscus lens L16 arranged on the image side of the biconvex lens L15 and whose concave surface faces the object side, a negative meniscus lens L17 whose concave surface faces the object side, and a biconvex lens L18, which are arranged in order from the object side to the image side.

The first to third lens groups G1 to G3 are all configured as movable lens groups that are moved in the optical axis direction during zooming.

An aperture stop S is arranged between the positive meniscus lens L8 and the positive meniscus lens L9 in the third lens group G3.

An image plane IP is arranged on the image side of the third lens group G3.

Table 10 shows lens data according to Numerical Example 4 in which specific numerical values are applied to the zoom lens 4 according to the fourth embodiment.

TABLE 10

| Surface No. | | R | D | N d | ν d |
|---|---|---|---|---|---|
| | 1 | 143.699 | 1.500 | 1.84666 | 23.78 |
| | 2 | 74.743 | 8.485 | 1.49700 | 81.61 |
| | 3 | −575.372 | 0.200 | | |
| | 4 | 64.014 | 5.945 | 1.69680 | 55.46 |
| | 5 | 177.535 | D 5 | | |
| (ASP) | 6 | 70.604 | 1.141 | 1.85135 | 40.10 |
| | 7 | 17.182 | 7.710 | | |
| | 8 | −30.322 | 1.073 | 1.88300 | 40.80 |
| | 9 | −108.626 | 2.800 | | |
| | 10 | 45.057 | 3.275 | 1.94595 | 17.98 |
| | 11 | −76.707 | D 11 | | |
| (ASP) | 12 | −26.704 | 0.800 | 1.85135 | 40.10 |
| (ASP) | 13 | 723.221 | D 13 | | |
| | 14 | 23.543 | 2.805 | 1.61800 | 63.39 |
| | 15 | 160.000 | 2.000 | | |
| (Aperture stop) | 16 | INF | 0.775 | | |
| (ASP) | 17 | 35.434 | 2.000 | 1.62263 | 58.16 |

TABLE 10-continued

| Surface No. | | R | D | Nd | νd |
|---|---|---|---|---|---|
| (ASP) | 18 | 81.188 | 0.800 | | |
| | 19 | 22.655 | 3.043 | 1.74330 | 49.33 |
| | 20 | −204.757 | 0.900 | 2.00069 | 25.46 |
| | 21 | 22.668 | 3.477 | | |
| (ASP) | 22 | 22.632 | 3.339 | 1.62263 | 58.16 |
| (ASP) | 23 | −84.722 | 4.241 | | |
| | 24 | −99.178 | 2.673 | 1.80518 | 25.46 |
| | 25 | −16.272 | 0.800 | 1.80450 | 39.64 |
| (ASP) | 26 | 196.608 | 1.960 | | |
| | 27 | 78.392 | 3.185 | 1.49700 | 81.61 |
| | 28 | −17.378 | 1.000 | 1.81600 | 46.57 |
| | 29 | −439.859 | 2.888 | | |
| | 30 | −14.598 | 0.800 | 1.69680 | 55.46 |
| | 31 | −25.352 | 3.072 | | |
| | 32 | 41.619 | 3.098 | 1.48749 | 70.44 |
| | 33 | −195.397 | D 33 | | |

In the zoom lens 4, the object-side surface (the 6th surface) of the negative meniscus lens L4 in the second lens group G2, both the surfaces (the 12nd surface and the 13th surface) of the negative meniscus lens L7 in the second lens group G2, both the surfaces (the 17th surface and the 18th surface) of the positive meniscus lens L9 in the third lens group G3, both the surfaces (the 22nd surface and the 23rd surface) of the biconvex lens L12 in the third lens group G3, and the image-side surface (the 26th surface) of the biconcave lens L14 in the third lens group G3 are formed as aspherical surfaces. Table 11 shows aspherical coefficients A4, A6, A8, and A10 of the 4th, 6th, 8th, and 10th orders of the aspherical surfaces in Numerical Example 4 together with conic constants K.

TABLE 11

| Surface No | κ | A 4 | A 6 | A 8 | A 10 |
|---|---|---|---|---|---|
| 6 | 0.00000E+00 | 4.37047E−06 | 7.59552E−10 | −2.25250E−11 | 9.89565E−14 |
| 12 | 0.00000E+00 | −1.21566E−05 | 1.69048E−07 | −1.26214E−09 | 5.40925E−12 |
| 13 | 0.00000E+00 | −1.22885E−05 | 1.81234E−07 | −1.68127E−09 | 8.07890E−12 |
| 17 | 0.00000E+00 | 8.17372E−06 | −3.72841E−08 | −1.59653E−10 | −2.04488E−11 |
| 18 | 0.00000E+00 | 3.90782E−05 | −7.90150E−08 | 1.89218E−10 | −2.78950E−11 |
| 22 | 0.00000E+00 | 4.16865E−05 | −1.73731E−07 | 3.70242E−09 | −1.16521E−11 |
| 23 | 0.00000E+00 | −2.01909E−06 | −1.96061E−07 | 5.45184E−09 | −2.12924E−11 |
| 26 | 0.00000E+00 | 6.21888E−05 | 3.17320E−07 | −1.25662E−09 | 2.28464E−11 |

In the zoom lens 4, when zooming from the wide-angle end state to the telephoto end state, a surface spacing D5 between the first lens group G1 and the second lens group G2, a surface spacing D11 between the front group G2F in the second lens group G2 and the rear group G2R in the second lens group G2, a surface spacing D13 between the second lens group G2 and the third lens group G3, and a surface spacing D33 between the third lens group G3 and the image plane IP change. Table 12 shows the respective surface spacings in the wide-angle end state (f=18.82), the medium focal length state (f=56.03), and the telephoto end state (f=179.76) in Numerical Example 4, together with focal lengths f, F-numbers Fno, and half angles of view w.

TABLE 12

| f | 18.82 | 56.03 | 179.76 |
|---|---|---|---|
| Fno | 3.91 | 6.27 | 7.12 |
| ω | 40.30 | 14.20 | 4.51 |
| D5 | 1.706 | 20.650 | 56.109 |
| D11 | 2.979 | 3.643 | 10.063 |

TABLE 12-continued

| D13 | 26.515 | 10.968 | 3.049 |
|---|---|---|---|
| D33 | 13.265 | 41.725 | 59.995 |

Figure 14:
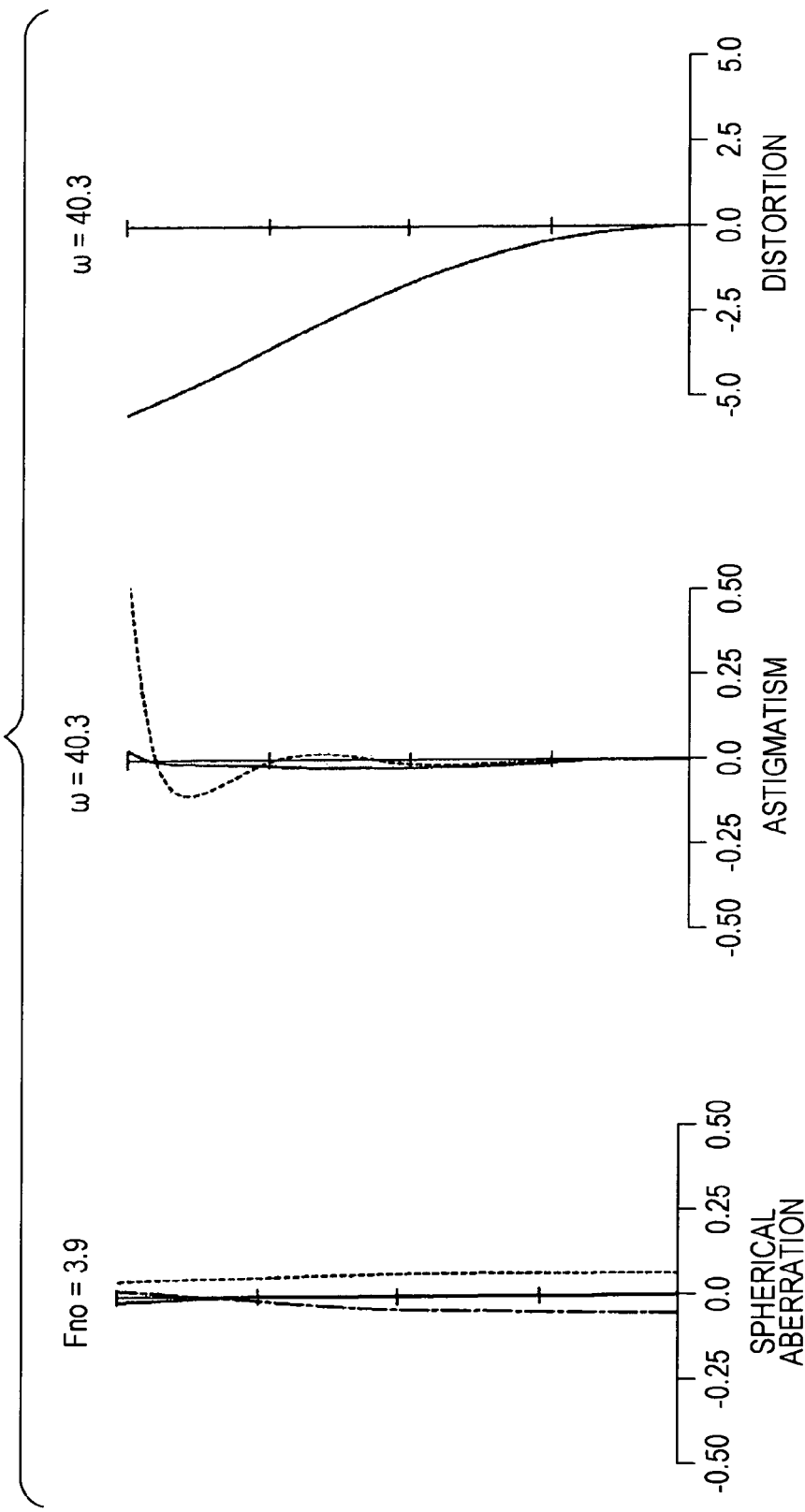
FIG. 14 is an aberration diagram showing, together with FIG. 15 and FIG. 16, aberrations according to a numerical example in which specific numerical values are applied to the fourth embodiment, illustrating spherical aberration, astigmatism, and distortion in the wide-angle end state.
Figure 15:
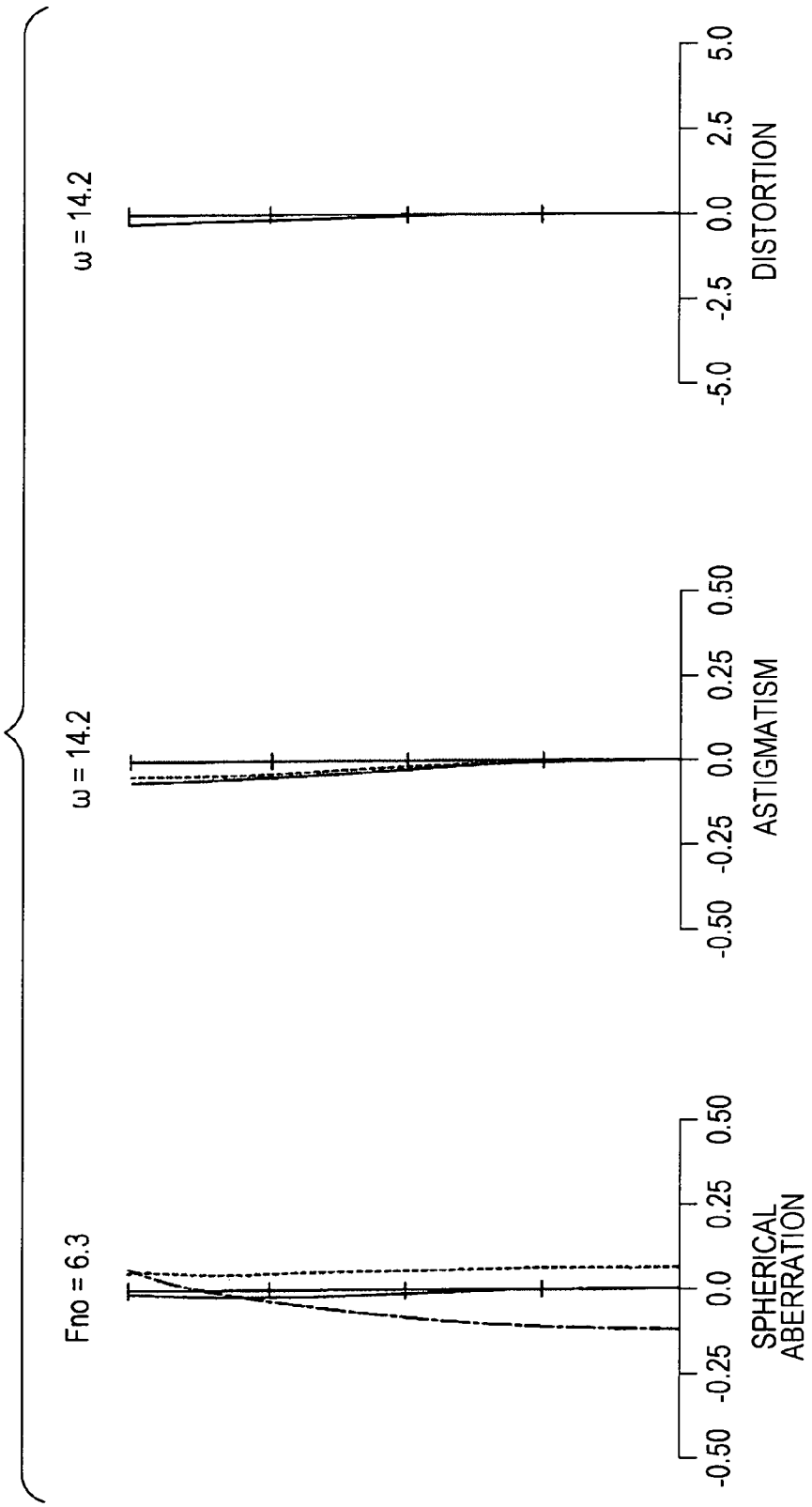
FIG. 15 is a diagram showing spherical aberration, astigmatism, and distortion in the medium focal length state.

FIGS. 14 to 16 are various aberration diagrams when in focus at infinity according to Numerical Example 4. FIGS. 14, 15, and 16 are each a spherical aberration diagram, an astigmatism diagram, and a distortion diagram in the wide-angle end state, the medium focal length state, and the telephoto end state, respectively.

In each of FIGS. 14 to 16, in the spherical aberration diagram, the solid line, the alternate long and short dash line, and the dotted line indicate the values for the d-line (wavelength: 587.6 nm), the g-line (wavelength: 435.8 nm), and the C-line (wavelength: 656.3 nm), respectively. In the astigmatism diagram, the solid line and the dotted line indicate the value in the sagittal image plane, and the value in the meridional image plane, respectively.

It is apparent from the aberration diagrams that various aberrations are favorably corrected for in Numerical Example 4, thus providing excellent image-forming performance.

[Values in Conditional Expressions for Zoom Lenses]

Table 13 shows values in conditional expressions (1) to (3) for the zoom lenses 1 to 4.

TABLE 13

| | | Zoom lens 1 | Zoom lens 2 | Zoom lens 3 | Zoom lens 4 |
|---|---|---|---|---|---|
| | βkFw | 103.16 | −7.45 | 3.85 | −4.60 |
| | βkRw | −0.01 | 0.11 | −0.24 | 0.20 |
| Conditional expression (1) | $(1-\beta KFw) \cdot \beta KRw$ | 0.94 | 0.92 | 0.67 | 1.12 |
| | fk | 38.54 | 38.32 | 75.70 | 44.15 |
| | f3 | 16.11 | 16.65 | 21.72 | 23.98 |
| Conditional expression (2) | fk/f3 | 2.39 | 2.30 | 3.49 | 1.84 |
| | βG4t | 11.06 | 4.29 | | |
| | βG5t | 0.21 | 0.52 | | |
| Conditional expression (3) | $(1-\beta G4t)^2 \cdot (\beta G5t)^2$ | 4.55 | 2.92 | | |

As is apparent from Table 13, the zoom lenses 1 to 4 are configured to satisfy conditional expressions (1) to (3).

[Configuration of Imaging Apparatus]

An imaging apparatus according to an embodiment of the present invention includes a zoom lens, and an imaging device that converts an optical image formed by the zoom lens into an electrical signal. The zoom lens has a first lens group having positive refractive power, a second lens group having negative refractive power, and a third lens group having positive refractive power, which are arranged in the state order from the object side to the image side. When zooming from the wide-angle end state to the telephoto end state, the first lens group moves to the object side, and spacings between the lens groups change.

Also, in the imaging apparatus according to an embodiment of the present invention, in the third lens group, the zoom lens has at least two lenses including a positive lens arranged closest to the object side, and blur correction on the image plane when blur occurs is performed by moving the positive lens of the third lens group in a direction perpendicular to the optical axis.

In the imaging apparatus according to an embodiment of the present invention, as mentioned above, only the positive lens arranged closest to the object side in the third lens group is used as a blur correcting lens group. Thus, the weight of the blur correcting lens group is small, and the actuator for operating the blur correcting lens group becomes small, thereby achieving miniaturization.

In the imaging apparatus according to an embodiment of the present invention, the zoom lens satisfies the following conditional expression (1):

$$0.3 < (1-\beta kFW)\cdot \beta kRW < 1.9 \tag{1}$$

where
βkFW is the lateral magnification at the wide-angle end of the positive lens arranged closest to the object side in the third lens group, and
βkRW is the lateral magnification at the wide-angle end of a lens group including all the lenses arranged closer to the image side than the positive lens arranged closest to the object side in the third lens group.

Conditional expression (1) is an expression that defines the relationship between the lateral magnification at the wide-angle end of the positive lens arranged closest to the object side in the third lens group, and the lateral magnification at the wide-angle end of the lens group including all the lenses arranged closer to the image side than the positive lens.

A value below the lower limit of conditional expression (1) causes the amount of movement of the positive lens (blur correcting lens) for performing blur correction to become large, leading to increased size of the mechanism for performing blur correction.

Conversely, a value above the upper limit of conditional expression (1) makes it hard to favorably correct aberration produced when correcting blur.

Therefore, when the zoom lens of the imaging apparatus satisfies conditional expression (1), it is possible to make the amount of movement of the positive lens small to thereby achieve miniaturization of the mechanism for performing blur correction, and also favorably correct aberration produced when correcting blur.

It should be noted that in the imaging apparatus according to an embodiment of the present invention, it is more desirable to set the range of conditional expression (1) to the range of the following conditional expression (1)':

$$0.5 < (1-\beta kFW)\cdot \beta kRW < 1.5. \tag{1'}$$

When the zoom lens of the imaging apparatus satisfies conditional expression (1)', it is possible to make the amount of movement of the positive lens smaller to thereby achieve further miniaturization of the mechanism for performing blur correction, and also more favorably correct aberration produced when correcting blur.

[Embodiment of Imaging Apparatus]

FIG. 17 is a block diagram of an imaging apparatus according to an embodiment of the present invention, and a digital still camera according to another embodiment of the present invention.

An imaging apparatus (digital still camera) 100 has a camera block 10 having an imaging function, a camera signal processing section 20 that performs signal processing such as analog-digital conversion on a shot image signal, and an image processing section 30 that performs recording and reproduction processing of the image signal. The imaging apparatus 100 also includes a liquid crystal display (LCD) 40 that displays a shot image or the like, a reader/writer (R/W) 50 that writes and reads the image signal to and from a memory card 1000, a central processing unit (CPU) 60 that controls the entire imaging apparatus, an input section 70 made up of various kinds of switches or the like with which desired operations are made by the user, and a lens drive control section 80 that controls the drive of lenses arranged in the camera block 10.

The camera block 10 includes an optical system including a zoom lens 11 (the zoom lens 1, 2, 3, or 4 to which an embodiment of the present invention is applied), an imaging device 12 such as a charge coupled device (CCD) or a complementary metal-oxide semiconductor (CMOS), and the like.

The camera signal processing section 20 performs various kinds of signal processing on an output signal from the imaging device 12, such as conversion into a digital signal, noise removal, image quality correction, and conversion into a luminance/color-difference signal.

The image processing section 30 performs processing such as compression/encoding and decompression/decoding of an image signal on the basis of a predetermined image data format, and conversion of a data specification such as resolution.

The LCD 40 has the function of displaying the state of an operation on the input section 70 made by the user, and various kinds of data such as a shot image.

The R/W 50 performs writing of the image data encoded by the image processing section 30 to the memory card 1000, and reading of the image data recorded on the memory card 1000.

The CPU 60 functions as a control processing section that controls individual circuit blocks provided in the imaging apparatus 100. The CPU 60 controls the individual circuit blocks on the basis of an instruction input signal from the input section 70, or the like.

The input section 70 is formed by, for example, a shutter release button for performing a shutter operation, a selecting switch for selecting an operation mode, and the like. The input section 70 outputs an instruction input signal based on a user's operation to the CPU 60.

The lens drive control section 80 controls a motor (not shown) or the like which drives the individual lenses of the zoom lens 11 on the basis of a control signal from the CPU 60.

The memory card 1000 is, for example, a semiconductor memory that is removably inserted in a slot connected to the R/W 50.

The operation of the imaging apparatus 100 will be described below.

When in the shooting standby state, under control of the CPU 60, an image signal shot by the camera block 10 is outputted to the LCD 40 via the camera signal processing section 20, and is displayed as a camera-through image. When an instruction input signal for zooming is inputted from the input section 70, the CPU 60 outputs a control signal to the lens drive control section 80, and a predetermined lens of the zoom lens 11 is moved on the basis of control by the lens drive control section 80.

When a shutter (not shown) in the camera block 10 is operated by an instruction input signal from the input section 70, a shot image signal is outputted from the camera signal processing section 20 to the image processing section 30, where the image signal is subjected to a compression encoding process, and converted into digital data in a predetermined data format. The converted data is outputted to the R/W 50, and written to the memory card 1000.

It should be noted that focusing is done as the lens drive control section 80 moves a predetermined lens of the zoom lens 11 on the basis of a control signal from the CPU 60 when, for example, the shutter release button of the input section 70 is pressed halfway, or pressed all the way for recording (shooting).

To reproduce image data recorded on the memory card 1000, a predetermined piece of image data is read from the memory card 1000 by the R/W 50 in accordance with an operation made on the input section 7, and after a decompression and decoding process by the image processing section 30, a reproduced image signal is outputted to the LCD 40, and a reproduced image is displayed.

While the above-mentioned embodiments are directed to the case of an imaging apparatus as applied to a digital still camera, the scope of application of the imaging apparatus is not limited to a digital still camera. The imaging apparatus can be widely applied to, for example, the camera section of digital input/output equipment such as a digital video camera, a mobile phone with an embedded camera, and a personal digital assistant (PDA) with an embedded camera.

A zoom lens and an imaging apparatus according to an embodiment of the present invention can achieve miniaturization and also ensure high image-forming performance while providing a blur correction function.

The present application contains subject matter related to that disclosed in Japanese Priority Patent Application JP 2010-108665 filed in the Japan Patent Office on May 10, 2010, the entire contents of which are hereby incorporated by reference.

The shapes and numerical values of individual sections illustrated in each of the above-mentioned embodiments are merely an example of embodiment for carrying out the present invention. The technical scope of the present invention should not be construed restrictively on the basis of these shapes and numerical values.

What is claimed is:

1. A zoom lens comprising:
a first lens group having positive refractive power;
a second lens group having negative refractive power; and
a third lens group having positive refractive power,
wherein the first, second, and third lens groups are arranged in that order from an object side to an image side,
wherein when zooming from a wide-angle end state to a telephoto end state, the first lens group moves to the object side, and spacings between the first, second, and third lens groups change,
wherein the third lens group has at least two lenses including a first lens that is a positive lens arranged closer to the object side than all other lenses of the third lens group,
wherein the zoom lens is configured to perform blur correction when blur occurs on an image plane by moving the first lens of the third lens group in a direction perpendicular to an optical axis, and
wherein the lenses of the third lens group are configured such that the following conditional expression (1) is satisfied, $$0.3 < (1-\beta kFW) \cdot \beta kRW < 1.9 \tag{1}$$

where:
$\beta kFW$ is a lateral magnification at a wide-angle end of the first lens of the third lens group, and
$\beta kRW$ is a lateral magnification at a wide-angle end of a lens sub-group including all lenses of the third lens group other than the first lens.

2. The zoom lens according to claim 1,
wherein the lenses of the third lens group are configured such that the following conditional expression (2) is satisfied, $$1.5 < fk/f3 < 4.0 \tag{2}$$

where:
fk is a focal length of the first lens of the third lens group, and
f3 is a focal length of the third lens group.

3. The zoom lens according to claim 1,
wherein the first lens of the third lens group is arranged on the object side of an aperture stop, and the lens sub-group that includes all lenses of the third lens group other than the first lens is arranged on the image side of the aperture stop and has positive refractive power.

4. The zoom lens according to claim 1, further comprising:
a fourth lens group arranged on the image side of the third lens group and having negative refractive power, the fourth lens group being moved in an optical axis direction to perform focusing; and
a fifth lens group arranged on the image side of the fourth lens group and having positive refractive power,
wherein the fourth and fifth lens groups are configured such that the following conditional expression (3) is satisfied, $$2.5 < (1-\beta G4t)^2 \cdot (\beta G5t)^2 < 5.0, \tag{3}$$

where:
$\beta G4t$ is a lateral magnification of the fourth lens group, and
$\beta G5t$ is a lateral magnification of the fifth lens group.

5. The zoom lens according to claim 4,
wherein the fourth lens group includes only a single negative lens.

6. An imaging apparatus comprising:
a zoom lens; and
an imaging device that converts an optical image formed by the zoom lens into an electrical signal,
wherein the zoom lens has
a first lens group having positive refractive power,
a second lens group having negative refractive power, and
a third lens group having positive refractive power,
wherein the first, second, and third lens groups are arranged in that order from an object side to an image side,
wherein, when zooming from a wide-angle end state to a telephoto end state, the first lens group moves to the object side, and spacings between the first, second, and third lens groups change,
wherein the third lens group has at least two lenses including a first lens that is a positive lens arranged closer to the object side than all other lenses of the third lens group,
wherein the zoom lens is configured to perform blur correction when blur occurs on an image plane by moving the first lens of the third lens group in a direction perpendicular to an optical axis, and
wherein the lenses of the third lens group are configured such that the following conditional expression (1) is satisfied, $$0.3 < (1\beta kFW) \cdot \beta kRW < 1.9 \tag{1}$$

where:
- βkFW is a lateral magnification at a wide-angle end of the first lens of the third lens group, and
- βkRW is a lateral magnification at a wide-angle end of a lens sub-group including all lenses of the third lens group other than the first lens.

* * * * *